US012717094B2

(12) United States Patent
Morgan et al.

(10) Patent No.: US 12,717,094 B2
(45) Date of Patent: Aug. 25, 2026

(54) PLUGGABLE OPTICAL CONNECTOR WITH INTERFACIAL ALIGNMENT FEATURES

(71) Applicant: Intel Corporation, Santa Clara, CA (US)

(72) Inventors: Wesley B. Morgan, Lake Oswego, OR (US); Mohanraj Prabhugoud, Beaverton, OR (US); David Shia, Portland, OR (US); Eric J. M. Moret, Beaverton, OR (US); Pooya Tadayon, Portland, OR (US); Tarek A. Ibrahim, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 17/871,558

(22) Filed: Jul. 22, 2022

(65) Prior Publication Data

US 2024/0027697 A1 Jan. 25, 2024

(51) Int. Cl.
*G02B 6/36* (2006.01)
*G02B 6/38* (2006.01)

(52) U.S. Cl.
CPC ......... *G02B 6/3897* (2013.01); *G02B 6/3885* (2013.01); *G02B 6/3893* (2013.01)

(58) Field of Classification Search
CPC .. G02B 6/3897; G02B 6/3885; G02B 6/3893; G02B 6/30; G02B 6/36; G02B 6/4249; G02B 6/4292
See application file for complete search history.

(56) References Cited

U.S. PATENT DOCUMENTS

| | | | |
|---|---|---|---|
| 6,004,042 | A | 12/1999 | Million et al. |
| 6,632,023 | B1 | 10/2003 | Ogawa et al. |
| 6,879,765 | B2 | 4/2005 | Kuzma |
| 6,896,422 | B2 | 5/2005 | Bennett et al. |
| 7,366,380 | B1 | 4/2008 | Peterson et al. |
| 7,684,201 | B2 | 3/2010 | Bailey et al. |
| 7,785,020 | B2 | 8/2010 | Kim et al. |
| 8,317,411 | B2 | 11/2012 | Fujiwara et al. |
| 8,801,299 | B2 | 8/2014 | Shimotsu et al. |
| 8,821,033 | B2 | 9/2014 | Rosenberg et al. |
| 8,867,869 | B2 | 10/2014 | Steijer et al. |
| 9,033,592 | B2 | 5/2015 | Arao et al. |
| 9,052,465 | B2 | 6/2015 | Kewitsch |
| 9,188,753 | B2 | 11/2015 | Lee et al. |
| 9,223,094 | B2 | 12/2015 | Schneider et al. |
| 9,229,172 | B2 | 1/2016 | Eberle, Jr. |

(Continued)

OTHER PUBLICATIONS

U.S. Appl. No. 18/345,106, filed Jun. 30, 2023.

(Continued)

*Primary Examiner* — Jennifer Doan
(74) *Attorney, Agent, or Firm* — Alliance IP, LLC

(57) ABSTRACT

Optical connectors with alignment features, and methods of forming the same, are disclosed herein. In one example, an optical ferrule includes holes to couple a fiber array to the optical ferrule, a mating protrusion to mate with an optical receptacle, and alignment features to align the fiber array with optical waveguides in the optical receptacle. The optical receptacle includes the optical waveguides, a mating cavity to mate with the mating protrusion on the optical ferrule, and alignment features to mate with the alignment features on the optical ferrule.

19 Claims, 12 Drawing Sheets

(56) References Cited

U.S. PATENT DOCUMENTS 9,310,553 B2 4/2016 Braunisch et al.
9,312,908 B2 4/2016 Mooney et al.
9,341,786 B1 5/2016 Gamache et al.
9,435,967 B2 9/2016 Braunisch et al.
9,459,420 B2 10/2016 Droesbeke et al.
9,494,750 B2 11/2016 Lee et al.
9,535,230 B2 1/2017 Newbury et al.
9,551,841 B2 1/2017 Bradley et al.
9,684,135 B2 6/2017 Mori et al.
9,766,414 B2 9/2017 Marcouiller et al.
9,851,509 B2 12/2017 Pfnuer et al.
9,874,711 B2 1/2018 Schneider et al.
9,877,091 B2 1/2018 Chen et al.
9,952,396 B2 4/2018 Van et al.
10,012,802 B2 7/2018 Newbury et al.
10,067,295 B2 9/2018 Eberle, Jr. et al.
10,094,989 B2 10/2018 Murakami et al.
10,101,543 B2 10/2018 Marcouiller et al.
10,175,431 B2 1/2019 Lin et al.
10,241,275 B2 3/2019 Li et al.
10,295,763 B2 5/2019 Ho et al.
10,317,638 B2 6/2019 Schneider et al.
10,353,157 B2 7/2019 Fortusini et al.
10,365,443 B2 7/2019 Nishio et al.
10,466,432 B2 11/2019 Luo et al.
10,473,866 B2 11/2019 Newbury et al.
10,488,603 B2 11/2019 Hodge et al.
10,509,188 B2 12/2019 Van et al.
10,615,900 B2 4/2020 Welch
10,620,382 B2 4/2020 Eberle, Jr. et al.
10,684,415 B1 6/2020 Bulthuis et al.
10,705,306 B2 7/2020 Geens et al.
10,712,503 B2 7/2020 Li et al.
10,732,366 B2 8/2020 Turcotte et al.
10,749,603 B2 8/2020 Sun et al.
10,782,474 B2 9/2020 Brusberg et al.
10,795,086 B2 10/2020 Matiss et al.
10,928,588 B2 2/2021 Sodagar et al.
10,942,324 B2 3/2021 Evans et al.
10,955,633 B2 3/2021 Schneider et al.
11,105,981 B2 8/2021 Brusberg et al.
11,243,348 B2 2/2022 Brown et al.
11,327,255 B1 5/2022 Huang
11,340,416 B2 5/2022 Geens et al.
11,347,008 B2 5/2022 Lu et al.
11,409,068 B2 8/2022 Marcouiller et al.
11,573,389 B2 2/2023 Schneider et al.
11,592,628 B2 2/2023 Murray et al.
11,609,400 B2 3/2023 Marcouiller et al.
11,624,876 B2 4/2023 Bauco
11,846,820 B2 12/2023 Geens et al.
11,886,023 B2 1/2024 Denoyer et al.
12,057,689 B2 8/2024 Van Baelen
12,130,487 B2 10/2024 Schneider et al.
12,276,858 B2 4/2025 Marcouiller et al.
2004/0057673 A1 3/2004 Kuzma
2008/0298004 A1 12/2008 Bailey et al.
2009/0010600 A1 1/2009 Kim et al.
2012/0063718 A1 3/2012 Steijer et al.
2012/0063729 A1 3/2012 Fujiwara et al.
2012/0243833 A1 9/2012 Shimotsu et al.
2013/0064495 A1 3/2013 Eberle, Jr.
2013/0202253 A1* 8/2013 Rosenberg ........... G02B 6/3839 385/70
2013/0272649 A1 10/2013 Braunisch et al.
2013/0272664 A1 10/2013 Arao et al.
2013/0294723 A1 11/2013 Kewitsch
2014/0133810 A1 5/2014 Schneider et al.
2014/0153875 A1 6/2014 Bradley et al.
2014/0242927 A1 8/2014 Mooney et al.
2014/0270655 A1 9/2014 Lee et al.
2015/0260936 A1 9/2015 Newbury et al.
2015/0293318 A1 10/2015 Droesbeke et al.
2015/0378112 A1 12/2015 Marcouiller et al.
2016/0062066 A1 3/2016 Lee et al.
2016/0091684 A1 3/2016 Van et al.
2016/0124166 A1 5/2016 Braunisch et al.
2016/0154185 A1 6/2016 Mori et al.
2016/0223751 A1 8/2016 Eberle, Jr. et al.
2016/0259141 A1 9/2016 Schneider et al.
2017/0102506 A1 4/2017 Newbury et al.
2017/0146750 A1 5/2017 Fortusini et al.
2017/0164076 A1 6/2017 Chen et al.
2017/0285270 A1 10/2017 Pfnuer et al.
2018/0052289 A1 2/2018 Lin et al.
2018/0081123 A1 3/2018 Li et al.
2018/0088287 A1 3/2018 Marcouiller et al.
2018/0239100 A1 8/2018 Schneider et al.
2018/0306995 A1 10/2018 Van et al.
2018/0329151 A1 11/2018 Nishio et al.
2018/0348448 A1 12/2018 Newbury et al.
2018/0348456 A1 12/2018 Ho et al.
2019/0018206 A1 1/2019 Luo et al.
2019/0086617 A1* 3/2019 Hodge ................. G02B 6/3841
2019/0089461 A1 3/2019 Sun et al.
2019/0094460 A1 3/2019 Brusberg et al.
2019/0094470 A1 3/2019 Eberle, Jr. et al.
2019/0113680 A1 4/2019 Sodagar et al.
2019/0146168 A1 5/2019 Turcotte et al.
2019/0219771 A1 7/2019 Li et al.
2019/0278039 A1 9/2019 Geens et al.
2019/0334649 A1 10/2019 Welch
2019/0353863 A1 11/2019 Schneider et al.
2019/0384005 A1* 12/2019 Brusberg ................. G02B 6/26
2019/0384007 A1 12/2019 Matiss et al.
2019/0384019 A1* 12/2019 Fiebig ...................... G02B 6/42
2019/0391350 A1* 12/2019 Evans .................. G02B 6/4292
2020/0192023 A1 6/2020 Brown et al.
2020/0249412 A1 8/2020 Marcouiller et al.
2020/0257057 A1 8/2020 Lu et al.
2020/0386966 A1 12/2020 Geens et al.
2021/0048587 A1 2/2021 Denoyer et al.
2021/0263252 A1 8/2021 Schneider et al.
2021/0302669 A1 9/2021 Murray et al.
2022/0003941 A1 1/2022 Bauco
2022/0252812 A1 8/2022 Geens et al.
2022/0260791 A1 8/2022 Ninomiya et al.
2022/0326466 A1 10/2022 Marcouiller et al.
2022/0413240 A1 12/2022 Nekkanty et al.
2023/0266552 A1 8/2023 Schneider et al.
2023/0288657 A1 9/2023 Marcouiller et al.

OTHER PUBLICATIONS

U.S. Appl. No. 18/217,165, filed Jun. 30, 2023.

U.S. Appl. No. 17/357,941, filed Jun. 24, 2022, Inventors Srikant Nekkanty et al.

U.S. Appl. No. 17/949,417, filed Sep. 21, 2022.

USPTO Non-Final Office Action received in U.S. Appl. No. 17/949,417, dated Jan. 16, 2026, 13 pages.

* cited by examiner 300
310
312
314
314
324
324
322
320
330

300
310
314
314
324
324
330
320

300
310
314
314
324
324
322
320
330

300
310
314
324
320
330

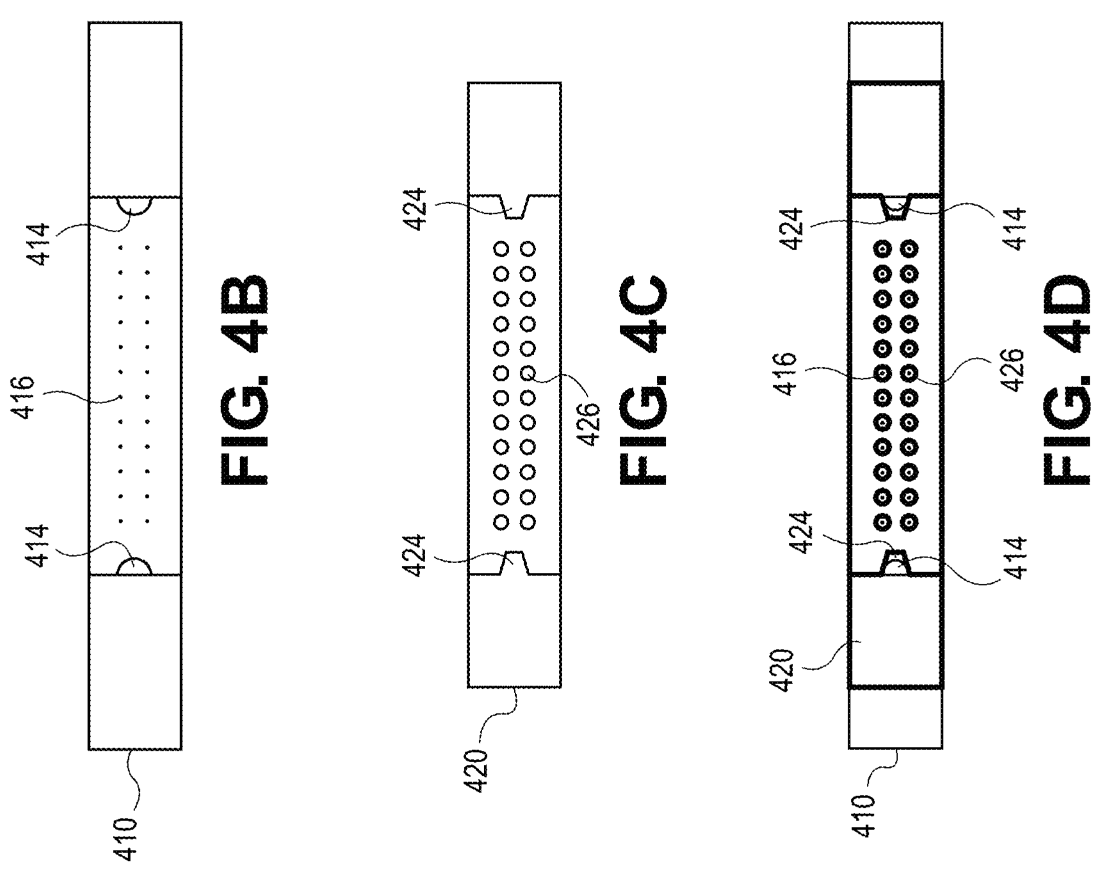
FIG. 4B
FIG. 4C
FIG. 4D
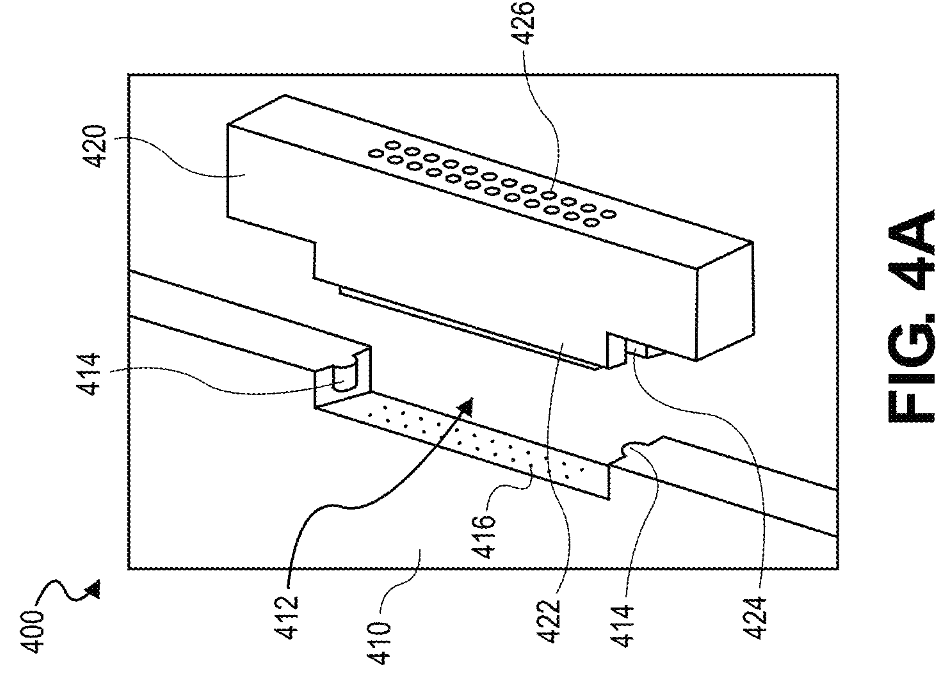
FIG. 4A 722
724
728
726
724
725
720
723
728

714
724
725

724
725
714
700
714
718
715
714
716
712

715
714
718
710

PLUGGABLE OPTICAL CONNECTOR WITH INTERFACIAL ALIGNMENT FEATURES

BACKGROUND

High-speed optical transceivers are crucial to meet the continuously increasing data rate demands of modern data centers and computing systems. For example, optical transceivers can be included with traditional computing components to enable them to communicate using high-speed optical interconnects rather than traditional electrical interconnects. An optical transceiver typically includes a photonic integrated circuit (PIC) connected to a fiber array via an optical connector, which uses adhesives to permanently attach the fiber array to the PIC.

BRIEF DESCRIPTION OF THE DRAWINGS

FIGS. 4A-D illustrate an optical connector set with a V-groove to half-cylindrical protrusion alignment scheme in accordance with certain embodiments.

DETAILED DESCRIPTION

Figure 1A:
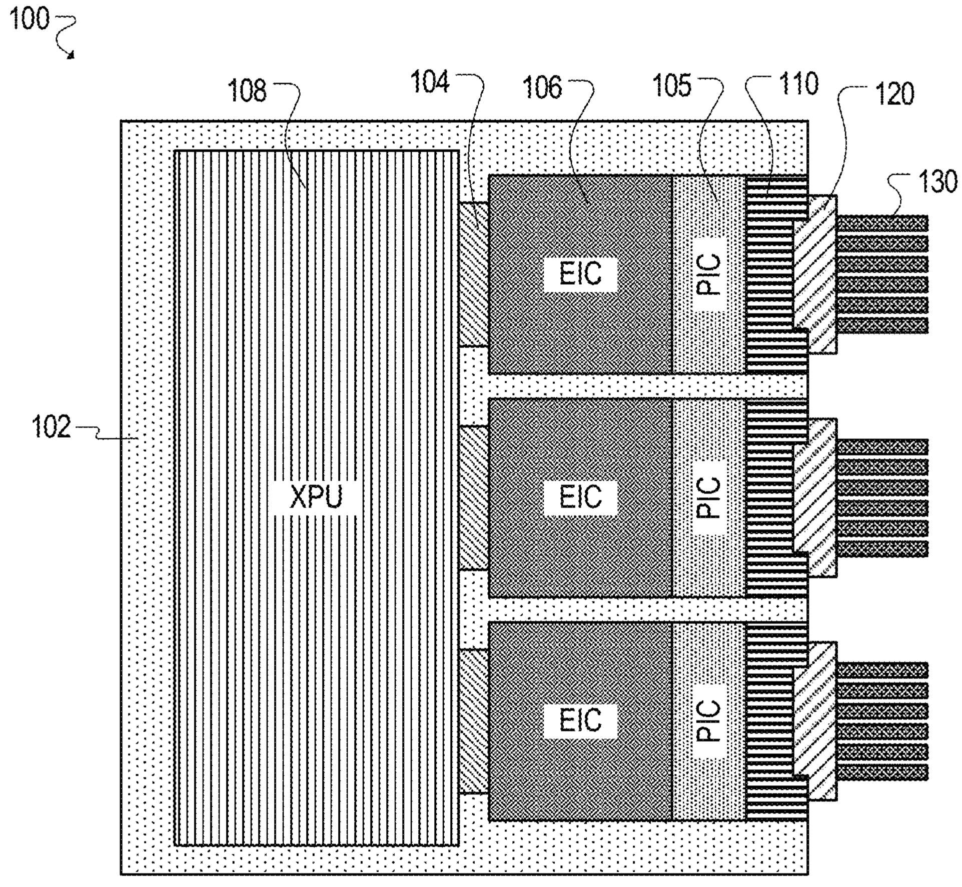
FIGS. 1A-B illustrate an example embodiment of an optical package with optical connectors having interfacial alignment features.

High-speed optical transceivers are crucial to meet the continuously increasing data rate demands of modern data centers and computing systems. For example, optical transceivers can be included with traditional computing components (e.g., processors, accelerators, FPGAs, switches, memory/storage, other ASIC nodes) to enable them to communicate using high-speed optical interconnects rather than traditional electrical interconnects. These optical transceivers typically include a photonic integrated circuit (PIC) connected to a fiber array via an optical connector. Moreover, the optical connector typically uses adhesives to permanently attach the fiber array to the PIC.

This approach has various disadvantages. For example, the fiber array is integrated into the optical package after the package has already been fully assembled and tested. As a result, any mishap in assembling the fiber array to the package can cause an otherwise good package not to yield. Moreover, the process of attaching the fiber array to the package is primarily manual, which reduces assembly throughput and increases the probability of low yield. For example, failure to align the fiber array to the PIC with the requisite degree of precision may result in a defective package. Further, the assembled package has a long "tail" of fibers hanging from its side. Due to the brittle nature of optical fibers, extra care is needed when handling and transporting the package, which adds cost to any product that leverages optical technology.

Accordingly, this disclosure presents embodiments of pluggable optical connectors with interfacial alignment features, which are integrated at the package level to eliminate the cumbersome and low-yield assembly steps required by other optical connectors. In some embodiments, for example, unique laser machining capability is leveraged to create intricate mechanical alignment features in a glass interposer containing light waveguides, which is coupled to the PIC. The same laser machining capability is also used to create corresponding mating and alignment features in a glass-fiber-bundle ferrule. The alignment features in the glass interposer and the glass ferrule cause the fibers in the ferrule to properly align to the waveguides in the interposer. This, in turn, allows signals to go back and forth between the optical package and external devices.

These embodiments provide various advantages. For example, the connection between the glass ferrule and the glass interposer is temporary and can be plugged and unplugged repeatedly. As a result, since the fiber bundle can be unplugged from the package, the package does not include a permanent fiber "tail," which makes handling and transporting the package easier and cheaper. In addition, the respective alignment features in the glass ferrule and the glass interposer provide alignment between the fibers and the waveguides with sub-micron precision. Further, the glass interposer can be integrated at the package level to eliminate the cumbersome and low-yield assembly steps required by other optical connectors. For example, unlike optical connectors that require manual fiber attachment, a glass interposer with waveguides can simply be attached to the rest of the package via a standard ball grid array (BGA) reflow process, which ultimately increases throughput and yield.

Figure 1B:
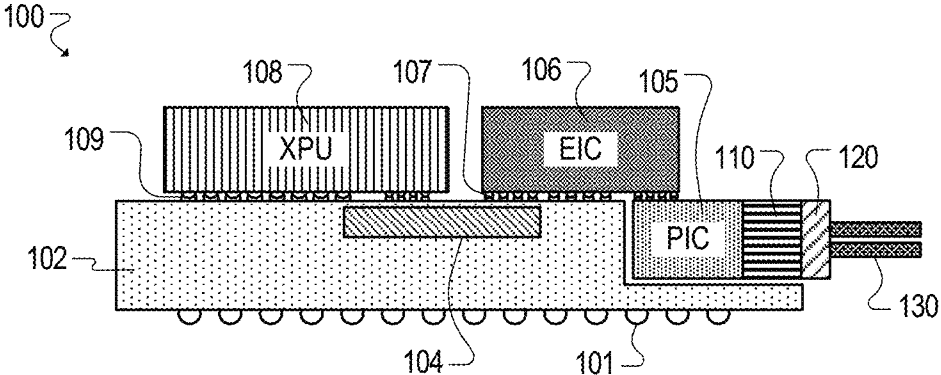

FIGS. 1A-B illustrate an example embodiment of an optical package 100 with optical connectors having interfacial alignment features. The optical package 100 includes photonic integrated circuits (PICs) 105, electronic integrated circuits (EICs) 106, and an XPU 108 attached to a package substrate 102. The PICs 105 are used to send and/or receive optical signals via fiber arrays 130 on behalf of the XPU 108, and the EICs 106 are driver circuits used to control the PICs 105. Moreover, each PIC 105 is optically coupled to an associated fiber array 130 via a mated optical connector, which collectively includes an optical interposer 110 and an optical ferrule 120. As described below, the interposer 110 and ferrule 120 include complementary sets of mating and alignment features, which are designed to mate while also achieving the requisite degree of alignment to optically couple the fiber array 130 to the PIC 105.

The interposer 110 is attached to the PIC 105 and includes waveguides (not shown) to route optical signals (e.g., light) to and from the PIC 105. The interposer 110 may also include other optical and/or electrical routing features, including through-glass vias.

The ferrule 120 includes an array of holes (not shown), which are attached to a bundle of optical (e.g., glass) fibers 130 referred to as a fiber array or fiber array unit (FAU). The fiber array 130 is used to send and receive optical signals to and from other components (not shown). In some embodiments, the interposer 110 and ferrule 120 may be made of glass.

Further, the interposer 110 and ferrule 120 include complementary sets of mating and alignment features, which collectively enable the interposer 110 and the ferrule 120 to mate with the proper degree of alignment. For example, the ferrule 120 includes a mating protrusion, which is designed to mate with a mating receptacle on the interposer 110. The interposer 110 and ferrule 120 also include other alignment features (not shown) to ensure that the fibers 130 in the ferrule 120 are properly aligned with the waveguides in the interposer 110. For example, when the optical ferrule 120 is plugged into to the optical interposer 110, their respective mating and alignment features engage, which causes the optical fibers 130 in the ferrule 120 to become precisely aligned with the waveguides in the interposer 110. In this manner, the PIC 105 is optically coupled to the fiber array 130 via the interposer 110 and ferrule 120, which enables to PIC 105 to send and receive optical signals via the fiber array 130.

Various example embodiments of the optical interposer 110 and optical ferrule 120, including their respective mating and alignment features, are described in further detail in connection with FIGS. 2-7. Any of the embodiments described herein, along with any combinations or variations of those embodiments, may be used to implement the optical interposer 110 and optical ferrule 120 in optical package 100.

In optical package 100, the package substrate 102 includes conductive contacts 101 (e.g., balls, pads) on the bottom surface, which serve as a second level interconnect (SLI) to a next-level component, such as a printed circuit board (e.g., a motherboard) and/or another integrated circuit package (not shown). The package substrate 102 also includes conductive traces (not shown) patterned in the substrate to provide power and input/output (I/O) to the respective components in the package 100 (e.g., XPU 108, EICs 106, PICs 105). In the illustrated embodiment, the package substrate 102 also includes a surface cavity formed along one of its edges, which houses the respective PICs 105.

The PICs 105 include components and circuitry for sending and receiving optical signals via the fiber arrays 130, such as laser diodes (LD)/modulators (LD-MOD) (e.g., for transmitting optical signals), photodiodes (PD) (e.g., for receiving optical signals), optical couplers, collimation/refocusing lenses, reflection mirrors, and so forth. Moreover, as described above, each PIC 105 is optically coupled to its associated fiber array 130 via a mated optical connector pair 110, 120. For example, an optical interposer 110 is attached to each PIC 105, and an optical ferrule 120 with a fiber array 130 is plugged into the optical interposer 110 to optically couple the fiber array 130 to the PIC 105 with the requisite degree of alignment. The other end of the fiber array 130 may be optically coupled to other components (not shown), such as another optical connector (e.g., a standard optical connector such as a mechanical transfer (MT) or multi-fiber push on (MPO) connector, or a connector similar to connectors 110, 120), a fiber cable, a switch, an integrated circuit component, and/or an external device or system.

Each PIC 105 is also connected to an associated EIC 106 via conductive contacts 107 (e.g., bumps/micro-bumps). The EICs 106 are used to control the PICs 105 and may include components such as transimpedance amplifiers (TIA), driver circuits, and so forth.

The XPU 108 is electrically connected to the package substrate 102 via conductive contacts 109 (e.g., bumps/micro-bumps), which serve as a first level interconnect (FLI) for the XPU 108. The XPU 108 is also connected to the EICs 106 via bridges 104 embedded in the substrate 102 (e.g., embedded multi-die interconnect bridges (EMIB)). In this manner, the XPU 108 can communicate optically using the respective PICs 105 associated with the EICs 106.

The XPU 108 generally refers to any integrated circuit component included in the optical package 100 to enable the component to communicate using fiber optics. For example, the XPU 108 may include any type or combination of processing units or other computing components, including, but not limited to, microcontrollers, microprocessors, processor cores, central processing units (CPUs), graphics processing units (GPUs), vision processing units (VPUs), tensor processing units (TPUs), application-specific integrated circuits (ASICs), field-programmable gate arrays (FPGAs), input/output (I/O) controllers and devices, switches, network interface controllers (NICs), persistent storage devices, and memory.

In some embodiments, the optical package 100 may be part of an electronic device or system, such as a mobile device, a wearable device, a computer, a server, a video playback device, a video game console, a display device, a camera, or an appliance.

It should be appreciated that optical package 100 is merely presented as an example. In other embodiments, certain components may be omitted, added, rearranged, modified, or combined. For example, embodiments may include any number or combination of PICs and EICs (e.g., for higher bandwidth and/or redundancy), optical connectors, optical interposers, optical ferrules, fibers, bridges, XPUs or other computing components, substrates, surface cavities in the substrate, conductive contacts, conductive traces, vias, integrated circuit packages, and so forth.

Figure 2:
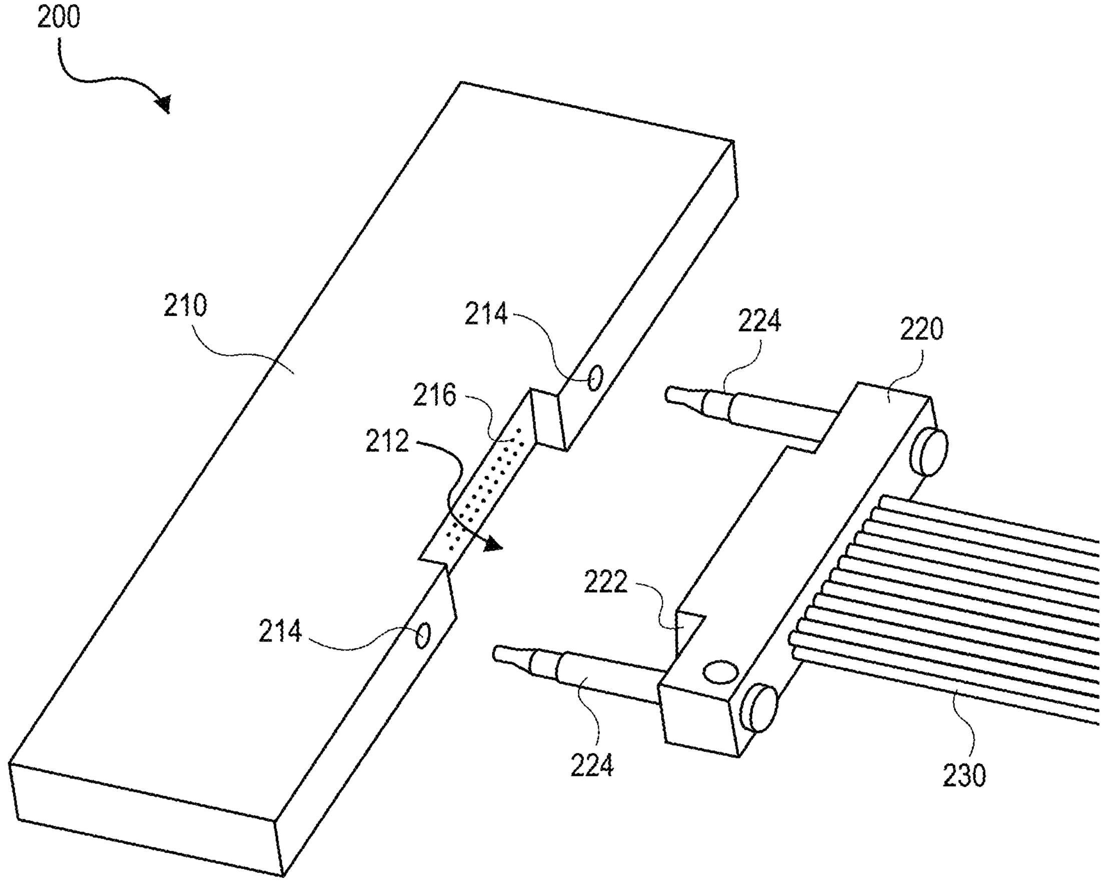
FIG. 2 illustrates an optical connector set with a pin-to-hole alignment scheme in accordance with certain embodiments.
Figures 3A, 3B, 3C, 3D:
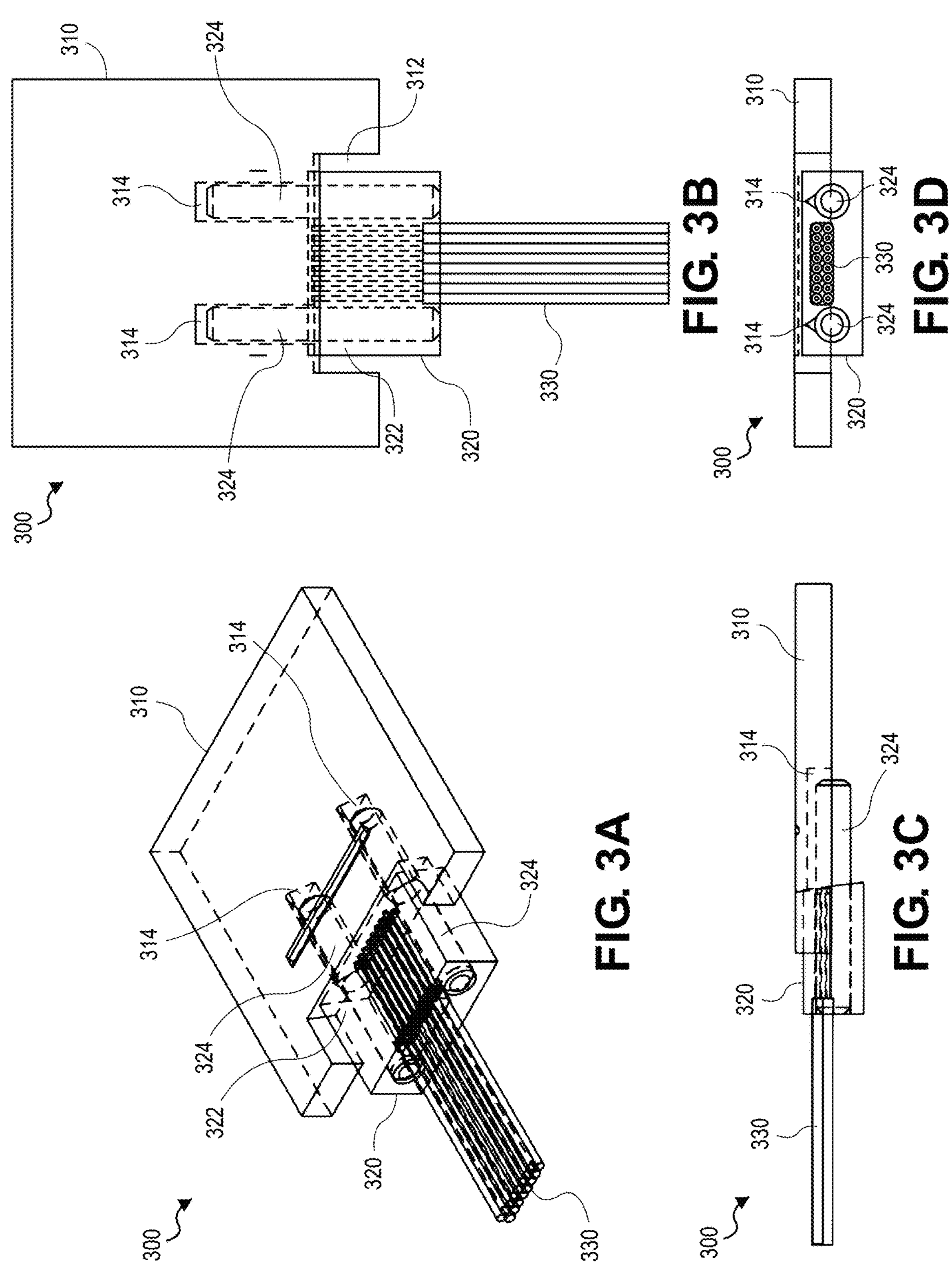
FIGS. 3A-D illustrate an optical connector set with a pin-to-groove alignment scheme in accordance with certain embodiments.

FIG. 2 illustrates an optical connector set 200 with a pin-to-hole alignment scheme in accordance with certain embodiments. In the illustrated embodiment, the optical connector set 200 includes an optical receptacle 210 and an optical ferrule 220 with complementary sets of mating and alignment features, which collectively enable the receptacle 210 and the ferrule 220 to mate with the requisite degree of alignment. For example, when the optical ferrule 220 is brought in close proximity to the optical receptacle 210, their respective mating and alignment features engage, which causes the optical fibers 230 in the ferrule 220 to become precisely aligned with the waveguides 216 in the receptacle 210, as described further below.

The optical receptacle 210 may be a glass component with embedded optical waveguides 216, such a glass interposer designed to interface with a photonic integrated circuit (PIC). In the illustrated embodiment, the mating and alignment features on the optical receptacle 210 include a mating cavity 212 and two pin holes 214. The mating cavity 212 is formed along an edge of the optical receptacle 210, such as by cutting out a portion of the straight edge of the receptacle 210 to form an edge or surface cavity 212 with sidewalls.

The embedded optical waveguides 216 extend to the surface of the mating cavity 212. The pin holes 214 are bored along the edge of the optical receptacle 210 on each side of the mating cavity 212.

The optical ferrule 220 may be a glass component with an array of holes (not shown) to which a bundle of fibers 230 is attached, also referred to as a fiber array or fiber array unit (FAU). In the illustrated embodiment, the mating and alignment features on the optical ferrule 220 include a mating protrusion 222 and two pins 224. The mating protrusion 222 is formed along an edge of the ferrule 220. The holes embedded with fibers 230 extend to the surface of the mating protrusion 222. The pins 224 are inserted into holes formed on the sides of the mating protrusion 222, such that the pins 224 protrude from the edge of the ferrule 220 on each side of the mating protrusion 222.

When the optical ferrule 220 is brought in close proximity to the optical receptacle 210, the pins 224 on the ferrule 220 engage the pin holes 214 on the receptacle 210 first, which helps guide the mating protrusion 222 on the ferrule 220 into the mating cavity 212 in the receptacle 210. In this manner, the fibers 230 in the ferrule 220 are properly aligned to the waveguides 216 in the receptacle 210.

FIGS. 3A-D illustrate an optical connector set 300 with a pin-to-groove alignment scheme in accordance with certain embodiments. In the illustrated embodiment, optical connector set 300 includes an optical receptacle 310 and an optical ferrule 320. The optical receptacle 310 includes a mating cavity 312, surface v-grooves 314, and optical waveguides 316. The optical ferrule 320 includes a mating protrusion 322, pins 324, and optical fibers 330.

Optical connector set 300 is similar to optical connector set 200, except the pin holes 214 in the receptacle 210 have been replaced with v-grooves 314 on the surface of the receptacle 310. In this manner, the pins 324 on the ferrule 320 mate with the v-grooves 314 on the receptacle 310. The remaining mating and alignment features of optical connector sets 200 and 300 are similar. One advantage of this variation is that v-grooves are easier to manufacture than holes.

FIGS. 4A-D illustrate an optical connector set 400 with a V-groove to half-cylindrical protrusion alignment scheme in accordance with certain embodiments. In the illustrated embodiment, optical connector set 400 includes an optical receptacle 410 and an optical ferrule 420. The optical receptacle 410 includes a mating cavity 412, sidewall protrusions 414, and optical waveguides 416. The optical ferrule 420 includes a mating protrusion 422, sidewall grooves 424, and an array of holes 426 for attaching a fiber array (not shown).

The sidewall protrusions 414 on the receptacle 410 are half-cylindrical protrusions on the sidewalls of the mating cavity 412. The sidewall grooves 424 in the ferrule 420 are V-grooves in the sidewalls of the mating protrusion 422. In this manner, the sidewall protrusions 414 on the receptacle 410 mate with the sidewall grooves 424 in the ferrule 420. The remaining mating and alignment features on optical connector set 400 are otherwise similar to those discussed in connection with other embodiments.

When the optical ferrule 420 is brought in close proximity to the optical receptacle 410, the mating protrusion 422 on the ferrule 420 engages the mating cavity 412 in the receptacle 410, and the sidewall V-grooves 424 in the mating protrusion 422 engage the sidewall half-cylindrical protrusions 414 in the mating cavity 412. In this manner, the fiber holes 426 in the ferrule 420 become properly aligned to the waveguides 416 in the receptacle 410 when the two sidewall V-grooves 424 engage the half-cylinder protrusions 414 as the ferrule 420 slides into contact with the receptacle 410.

Figure 5A:
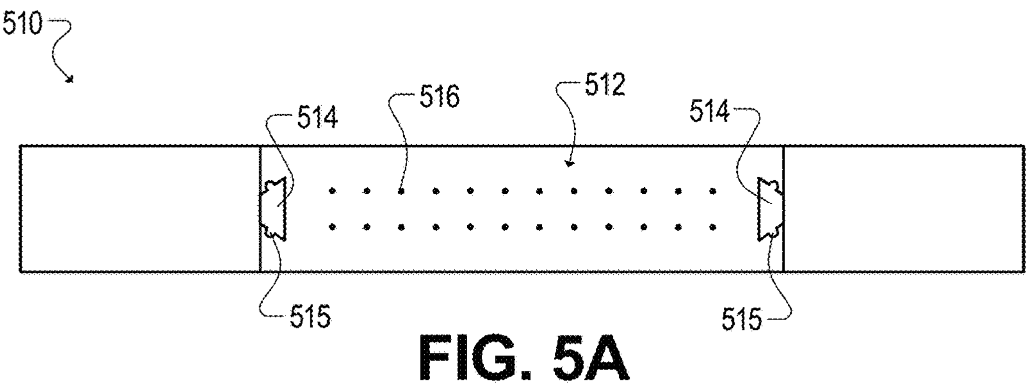
FIGS. 5A-C illustrate an optical connector set with a V-groove to ball protrusion alignment scheme in accordance with certain embodiments.
Figure 5B:
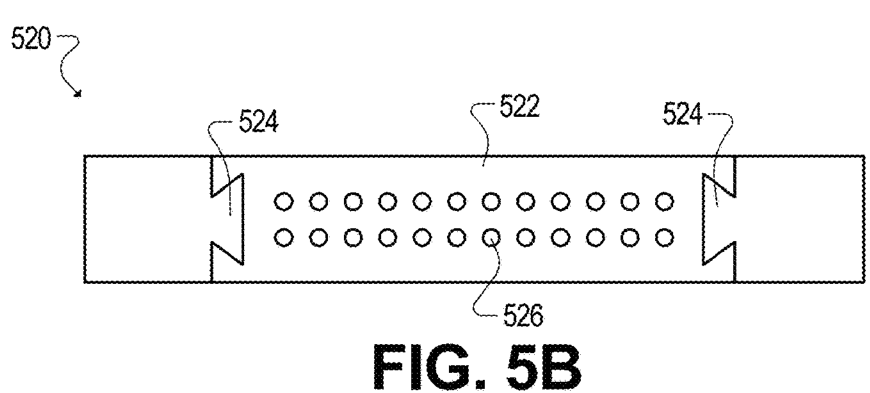
Figure 5C:
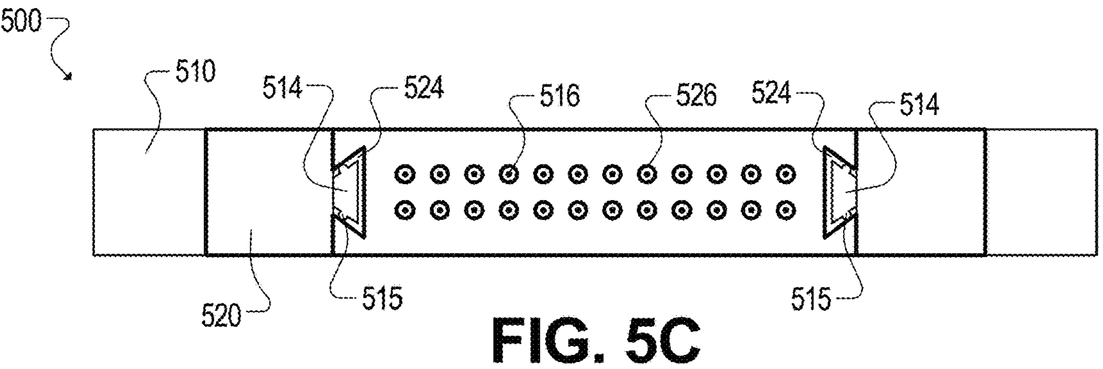

FIGS. 5A-C illustrate an optical connector set 500 with a V-groove to ball protrusion alignment scheme in accordance with certain embodiments. Optical connector set 500 is similar to optical connector set 400, except instead of V-grooves 424 engaging half-cylinder protrusions 414, the V-grooves 524 engage smaller ball-like protrusions 515. One advantage of this variation is a reduced probability of binding due to the smaller contact area of the ball protrusions 515.

In the illustrated embodiment, optical connector set 500 includes an optical receptacle 510 and an optical ferrule 520. The optical receptacle 510 includes a mating cavity 512, sidewall protrusions 514, 515, and optical waveguides 516. The optical ferrule 520 includes a mating protrusion 522, sidewall grooves 524, and an array of holes 526 for attaching a fiber array (not shown).

The sidewall protrusions 514 on the receptacle 510 are trapezoidal protrusions on the sidewalls of the mating cavity 512. These sidewall protrusions 514 also include additional ball/cylindrical protrusions 515 protruding from the surface of the trapezoidal protrusions. The sidewall grooves 524 in the ferrule 520 are V-grooves in the sidewalls of the mating protrusion 522. In this manner, the trapezoidal and ball protrusions 514, 515 on the receptacle 510 mate with the sidewall grooves 524 in the ferrule 520. The remaining mating and alignment features on optical connector set 500 are otherwise similar to those in optical connector set 400.

Figures 6A, 6B:
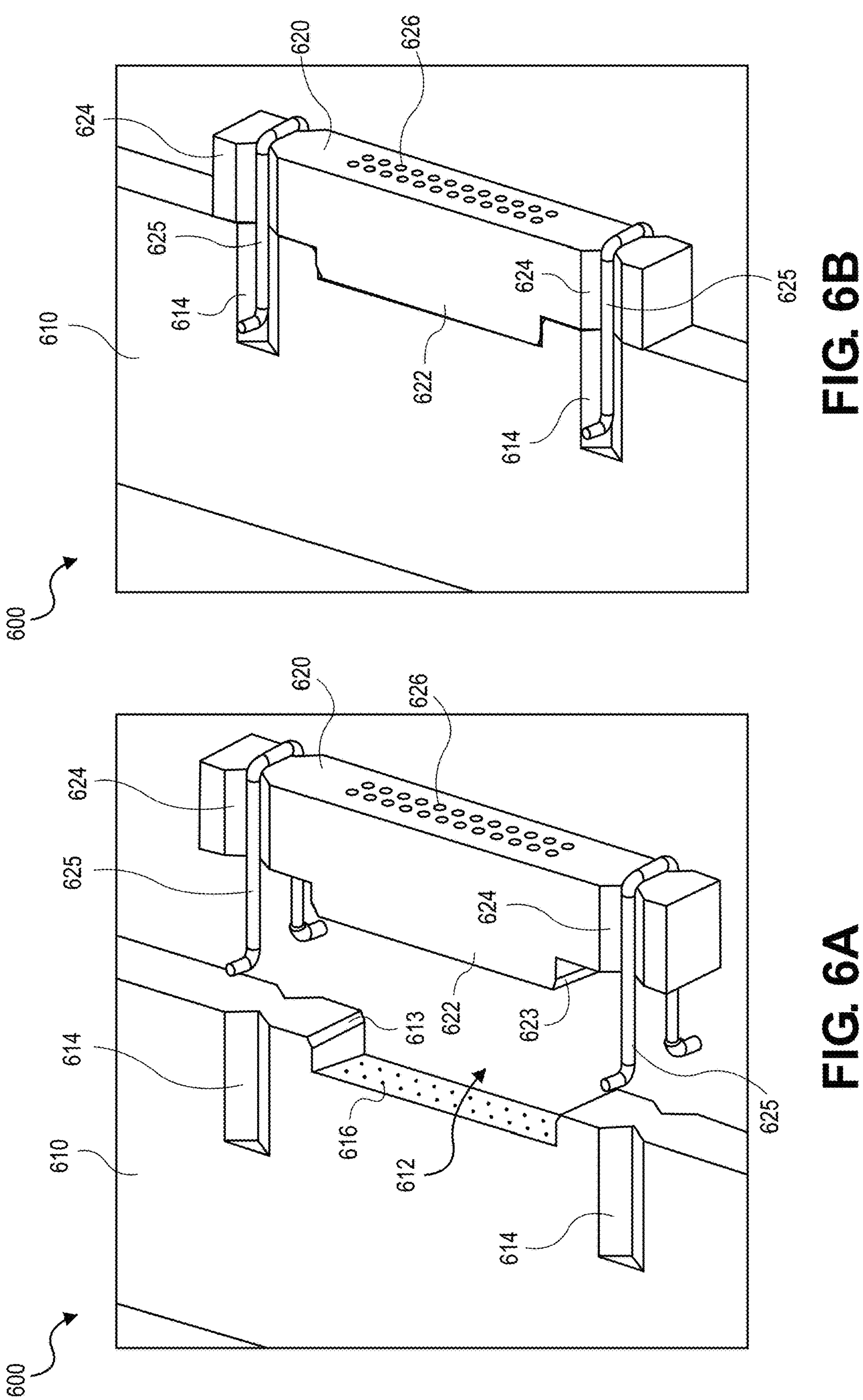
FIGS. 6A-B illustrate an optical connector set with a wire-based alignment scheme in accordance with certain embodiments.

FIGS. 6A-B illustrate an optical connector set 600 with a wire-based alignment scheme in accordance with certain embodiments. In the illustrated embodiment, wires 625 are used as guiding features to bring the mating protrusion 622 on the optical ferrule 620 within the vicinity of the mating cavity 612 in the optical receptacle 610. Moreover, in the aligned position (e.g., shown in FIG. 6B), the wires 625 also provide retention force to maintain the alignment.

In the illustrated embodiment, optical connector set 600 includes an optical receptacle 610 and an optical ferrule 620. The optical receptacle 610 includes a mating cavity 612, sidewall chamfers 613, wire grooves 614, and optical waveguides 616. The optical ferrule 620 includes a mating protrusion 622, sidewall chamfers 623, wire grooves 624, wires 625, and an array of holes 626 for attaching a fiber array (not shown).

The sidewall chamfers 613 on the receptacle 610 are chamfered edges 613 on the sidewalls of the mating cavity 612. Similarly, the sidewall chamfers 623 on the ferrule 620 are chamfered edges 623 on the sidewalls of the mating protrusion 622. The respective chamfers 613, 623 collectively help the mating protrusion 622 glide into the proper alignment with the mating cavity 612.

The wire grooves 614 in the receptacle 610 include four V-grooves on the top and bottom surfaces of the receptacle 610 (e.g., two on top and two on bottom). Similarly, the wire grooves 624 in the ferrule 620 include four V-grooves on the top and bottom surfaces of the ferrule 620. Further, wires 625 are embedded in the V-grooves 624 on the ferrule 620 and are designed to engage the corresponding V-grooves 614 on the receptacle 610.

The remaining mating and alignment features on optical connector set 600 are otherwise similar to those discussed in connection with other embodiments.

Figures 7A, 7B, 7C:
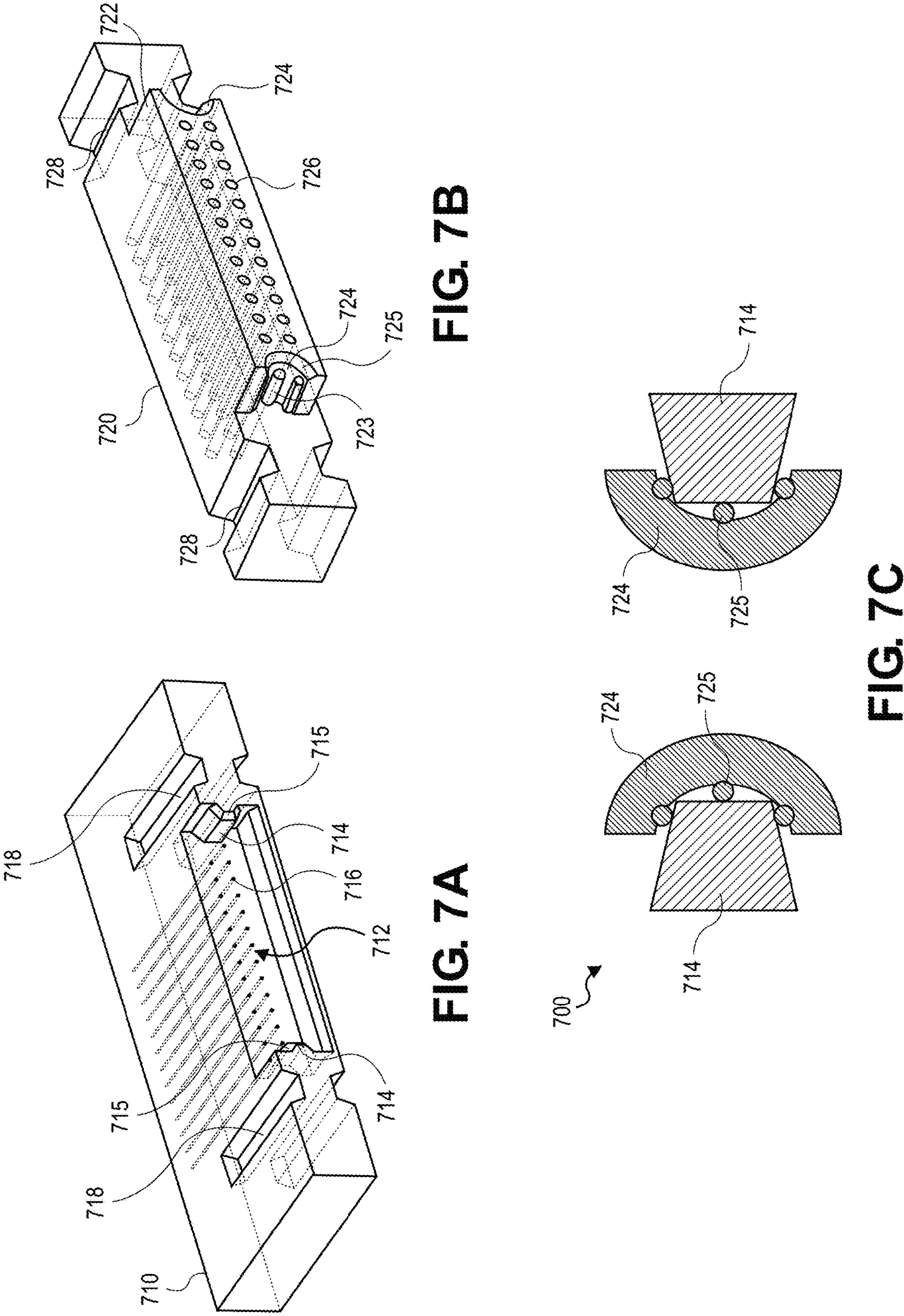
FIGS. 7A-C illustrate an optical connector set with a variety of alignment features in accordance with certain embodiments.

FIGS. 7A-C illustrate an optical connector set 700 with a variety of alignment features in accordance with certain embodiments. In particular, optical connector set 700 incorporates a variety of alignment features from, or similar to, those described in other embodiments. In the illustrated embodiment, optical connector set 700 includes an optical receptacle 710 and an optical ferrule 720. The optical receptacle 710 is shown in FIG. 7A, the optical ferrule 720 is shown in FIG. 7B, and an example of certain mated alignment features on the receptacle 710 and ferrule 720 is shown in FIG. 7C.

The optical receptacle 710 includes a mating cavity 712, sidewall protrusions 714 with chamfered surfaces/edges 715, and optical waveguides 716. The sidewall protrusions 714 are trapezoidal protrusions 714 on the sidewalls of the mating cavity 712, with chamfered surfaces 715 on the outer edges of the trapezoidal protrusions 714.

The optical ferrule 720 includes a mating protrusion 722, sidewall grooves 724 with chamfered surfaces/edges 725, and an array of holes 726 for attaching a fiber array (not shown). The sidewall grooves 724 are semi-circle or semi-cylindrical grooves 724 formed in the sidewalls of the mating protrusion 722, with chamfered surfaces 725 on the outer edges of the grooves 724. Further, the sidewall grooves 724 include three cylindrical protrusions 723 on the inner surfaces of the grooves 724.

The chamfered surfaces 715, 725 on the trapezoidal protrusions 714 and the semi-circle grooves 724 enable the ferrule 720 to glide onto the sidewall protrusions 714 and into the mating cavity 712 of the receptacle 710. Final alignment is achieved by the three cylindrical protrusions 723 interacting with the trapezoidal protrusions 714. This interaction generates self-centering forces to push the ferrule 720 relative to the receptacle 710 when there are sufficient biases in the relative position of the mating surfaces.

The receptacle 710 and ferrule 720 also include V-grooves 718, 728 on the top and bottom surfaces for a wire-based mating and alignment scheme.

It should be appreciated that the optical connector embodiments described in connection with FIGS. 1-7 are merely presented as examples. In other embodiments, certain components may be omitted, added, rearranged, modified, or combined. For example, mating and alignment features from the various embodiments may be combined or modified, such as by using different shapes for the alignment features (e.g., protrusions/grooves/cavities with other shapes), using different types of mating and alignment features/structures/mechanisms, reversing the complementary mating/alignment features on the receptacle versus the ferrule, and so forth. Further, in various embodiments, the optical receptacle may be a standalone connector or may be part of another component, such an optical interposer or PIC.

Figure 8:
FIG. 8 illustrates a process flow for packaging an integrated circuit in an optical package in accordance with certain embodiments.
Figure 8:
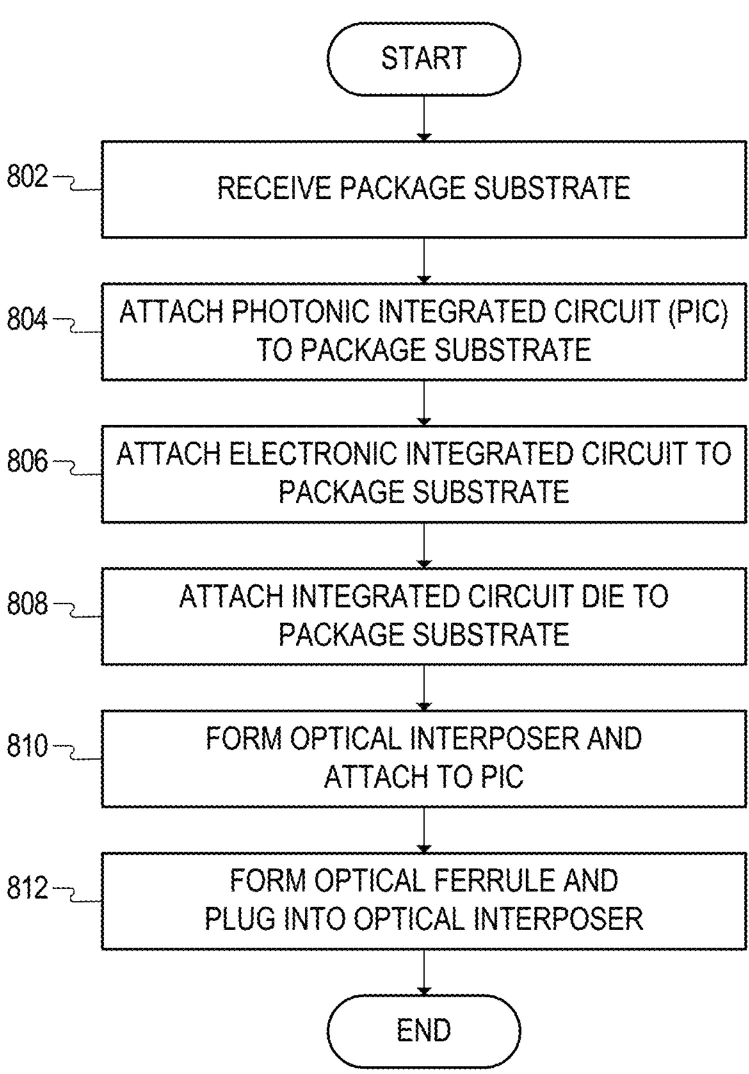

FIG. 8 illustrates a process flow 800 for packaging an integrated circuit in an optical package in accordance with certain embodiments. In some embodiments, for example, packaging process 800 may be used to form integrated circuit package 100 of FIGS. 1A-B. However, it will be appreciated in light of the present disclosure that packaging process 800 is only one example methodology for arriving at the example integrated circuit packages shown and described throughout this disclosure.

The process flow begins at block 802 by receiving a package substrate. For example, the package substrate may be an organic substrate formed from one or more organic compounds or materials. In some embodiments, the package substrate may come with preformed conductive contacts, conductive traces/vias, embedded bridges, and/or surface cavities. Alternatively, the conductive contacts, conductive traces/vias, embedded bridges, and/or surface cavities may be formed upon receiving the package substrate. For example, conductive contacts (e.g., balls, pads) may be formed on the bottom surface of the package substrate to serve as a second level interconnect (SLI) to a next-level component, such as a printed circuit board and/or another integrated circuit package. Conductive traces may be patterned in the substrate to provide power and I/O to the respective components that will be incorporated in the package, and one or more bridges may be embedded in the package substrate to interconnect those components. Further, a surface cavity may be formed along an edge of the package substrate to house a photonic integrated circuit (PIC).

The process flow then proceeds to block 804 to attach a photonic integrated circuit (PIC) to the package substrate. In some embodiments, the PIC may be adhesively bonded and/or electrically coupled to a surface cavity in the substrate.

The process flow then proceeds to block 806 to attach an electronic integrated circuit (EIC) to the package substrate and/or the PIC. For example, the EIC may be electrically connected to the substrate surface and/or the PIC via conductive contacts.

The process flow then proceeds to block 808 to attach an integrated circuit (IC) die to the package substrate. For example, the IC die may be electrically connected to the substrate surface via conductive contacts. The IC die may include any type of integrated circuit device or computing component, including, but not limited to, a microcontroller, a microprocessor, a central processing unit (CPU), a graphics processing unit (GPU), a vision processing unit (VPU), a tensor processing unit (TPU), an application-specific integrated circuit (ASIC), a field-programmable gate array (FPGA), a switch, a network interface controller (NIC), a memory device (e.g., memory, memory controller), and/or a persistent storage device (e.g., hard disk drive (HDD), solid state drive (SSD)), among other examples.

The process flow then proceeds to block 810 to form an optical interposer and attach the optical interposer to the PIC. The optical interposer may be formed by embedding optical waveguides in a glass substrate and patterning a set of mating and alignment features on an edge of the glass substrate (e.g., using laser-based machining techniques). The completed optical interposer is then attached to the PIC. In some embodiments, the remaining empty areas in the package may be filled with an epoxy.

In some embodiments, for example, a mating receptacle or cavity is formed on an edge of the glass interposer, with the optical waveguides extending to the mating cavity/receptacle. Alternatively, in some embodiments, a mating protrusion is formed on an edge of the glass interposer, with the optical waveguides extending through the mating protrusion.

Various additional alignment features may also be formed on the glass interposer, including, but not limited to, pins, pin holes, wires, pin or wire surface grooves, sidewall protrusions or sidewall grooves in the mating receptacle/cavity or the mating protrusion, chamfers (e.g., chamfered edges on the mating receptacle/cavity or mating protrusion, chamfered edges on the sidewall protrusions/grooves), and/or any of the other alignment features described throughout this disclosure (e.g., in connection with FIGS. 1-7).

In some embodiments, for example, the mating receptacle/cavity or the mating protrusion may include sidewall protrusions or sidewall grooves having any suitable shape, including, but not limited to, a V shape, a U shape, a semi-cylindrical shape, or a trapezoidal shape.

In some embodiments, the sidewall protrusions or sidewall grooves may themselves have additional mating protrusions or grooves having any suitable shape, including, but not limited to, a V shape, a U shape, a semi-cylindrical shape, or a trapezoidal shape.

In some embodiments, the glass interposer may include surface grooves to mate with pins or wires. The surface grooves may have any suitable shape, including, but not limited to, a V shape, a U shape, a semi-cylindrical shape, or a trapezoidal shape.

Further, in some embodiments, the glass interposer may include chamfers, including, but not limited to, chamfered edges on the sidewalls of the mating cavity/receptacle or the mating protrusion and/or chamfered edges on the sidewall protrusions or sidewall grooves.

The process flow then proceeds to block 812 to form an optical ferrule and plug the optical ferrule into the optical interposer. In some embodiments, the optical ferrule is formed by patterning a glass component (e.g., using laser-based machining techniques) with (i) an array of holes and (ii) a set of mating and alignment features designed to mate with corresponding features in the optical interposer. A fiber array is then attached to the holes formed in the optical ferrule (e.g., using an adhesive). The completed optical ferrule may then be plugged into the optical interposer to optically couple the fiber array to the PIC. For example, when the optical ferrule is plugged into the optical interposer, the holes and fibers in the ferrule align with the optical waveguides in the interposer, thus optically coupling the fiber array to the PIC attached to the interposer.

In some embodiments, for example, a mating protrusion is formed on an edge of the glass ferrule, with the holes in the ferrule extending through the mating protrusion. Alternatively, in some embodiments, a mating receptacle or cavity is formed on an edge of the glass ferrule, with the holes in the ferrule extending to the mating receptacle/cavity.

Various additional alignment features may also be formed on the glass ferrule, including, but not limited to, pins, pin holes, wires, pin or wire surface grooves, sidewall grooves or sidewall protrusions in the mating protrusion or the mating receptacle/cavity, chamfers (e.g., chamfered edges on the mating protrusion or mating receptacle/cavity, chamfered edges on the sidewall grooves/protrusions), and/or any of the other alignment features described throughout this disclosure (e.g., in connection with FIGS. 1-7).

In some embodiments, for example, the mating protrusion or the mating receptacle/cavity may include sidewall grooves or sidewall protrusions having any suitable shape, including, but not limited to, a V shape, a U shape, a semi-cylindrical shape, or a trapezoidal shape.

In some embodiments, the sidewall grooves or sidewall protrusions may themselves have additional mating grooves or protrusions having any suitable shape, including, but not limited to, a V shape, a U shape, a semi-cylindrical shape, or a trapezoidal shape.

In some embodiments, the glass ferrule may include surface grooves to mate with pins or wires. The surface grooves may have any suitable shape, including, but not limited to, a V shape, a U shape, a semi-cylindrical shape, or a trapezoidal shape.

Further, in some embodiments, the glass ferrule may include chamfers, including, but not limited to, chamfered edges on the sidewalls of the mating protrusion or the mating cavity/receptacle and/or chamfered edges on the sidewall grooves or sidewall protrusions.

At this point, the process flow may be complete. In some embodiments, however, the process flow may restart and/or certain blocks may be repeated. For example, in some embodiments, the process flow may restart at block 802 to package another integrated circuit die in an optical package.

Example Integrated Circuit Embodiments

Figure 9:
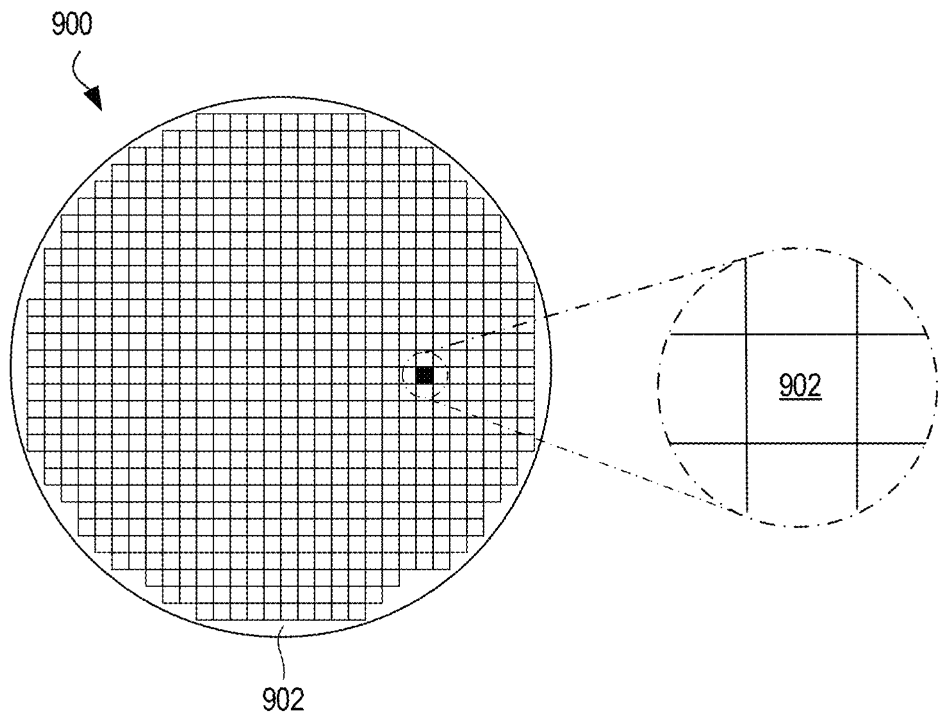
FIG. 9 is a top view of a wafer and dies that may be included in a microelectronic assembly, in accordance with any of the embodiments disclosed herein.

FIG. 9 is a top view of a wafer 900 and dies 902 that may be included in any of the embodiments disclosed herein. The wafer 900 may be composed of semiconductor material and may include one or more dies 902 having integrated circuit structures formed on a surface of the wafer 900. The individual dies 902 may be a repeating unit of an integrated circuit product that includes any suitable integrated circuit. After the fabrication of the semiconductor product is complete, the wafer 900 may undergo a singulation process in which the dies 902 are separated from one another to provide discrete "chips" of the integrated circuit product. The die 902 may be any of the dies disclosed herein. The die 902 may include one or more transistors (e.g., some of the transistors 1040 of FIG. 10, discussed below), supporting circuitry to route electrical signals to the transistors, passive components (e.g., signal traces, resistors, capacitors, or inductors), and/or any other integrated circuit components. In some embodiments, the wafer 900 or the die 902 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 902. For example, a memory array formed by multiple memory devices may be formed on a same die 902 as a processor unit (e.g., the processor unit 1202 of FIG. 12) or other logic that is configured to store information in the memory devices or execute instructions stored in the memory array. Various ones of the microelectronic assemblies disclosed herein may be manufactured using a die-to-wafer assembly technique in which some dies are attached to a wafer 900 that include others of the dies, and the wafer 900 is subsequently singulated.

Figure 10:
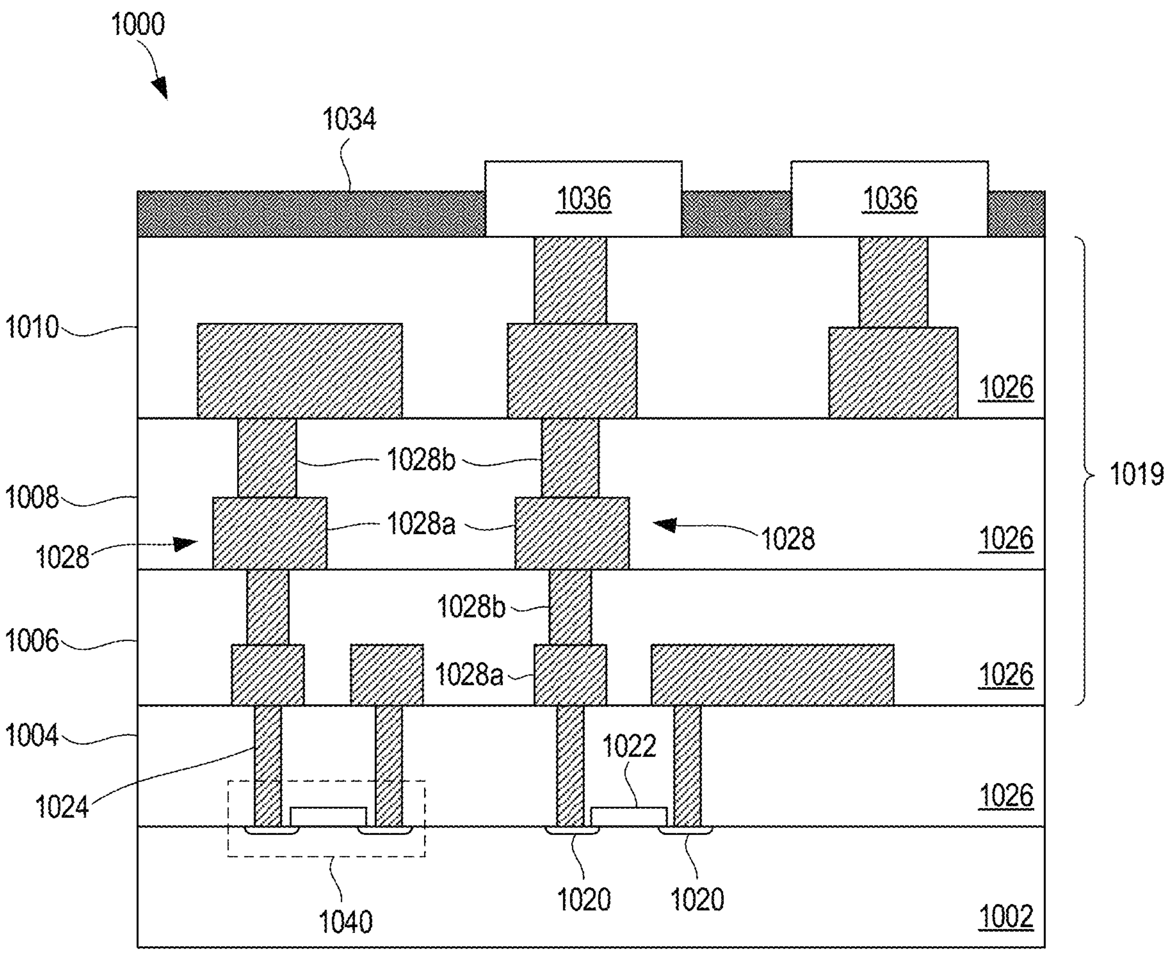
FIG. 10 is a cross-sectional side view of an integrated circuit device that may be included in a microelectronic assembly, in accordance with any of the embodiments disclosed herein.

FIG. 10 is a cross-sectional side view of an integrated circuit device 1000 that may be included in any of the embodiments disclosed herein (e.g., in any of the dies). One or more of the integrated circuit devices 1000 may be included in one or more dies 902 (FIG. 9). The integrated circuit device 1000 may be formed on a die substrate 1002 (e.g., the wafer 900 of FIG. 9) and may be included in a die (e.g., the die 902 of FIG. 9). The die substrate 1002 may be a semiconductor substrate composed of semiconductor material systems including, for example, n-type or p-type materials systems (or a combination of both). The die substrate 1002 may include, for example, a crystalline substrate formed using a bulk silicon or a silicon-on-insulator (SOI) substructure. In some embodiments, the die substrate 1002 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1002. Although a few examples of materials from which the die substrate 1002 may be formed are described here, any material that may serve as a foundation for an integrated circuit device 1000 may be used.

The die substrate 1002 may be part of a singulated die (e.g., the dies 902 of FIG. 9) or a wafer (e.g., the wafer 900 of FIG. 9).

The integrated circuit device 1000 may include one or more device layers 1004 disposed on the die substrate 1002. The device layer 1004 may include features of one or more transistors 1040 (e.g., metal oxide semiconductor field-effect transistors (MOSFETs)) formed on the die substrate 1002. The transistors 1040 may include, for example, one or more source and/or drain (S/D) regions 1020, a gate 1022 to control current flow between the S/D regions 1020, and one or more S/D contacts 1024 to route electrical signals to/from the S/D regions 1020. The transistors 1040 may include additional features not depicted for the sake of clarity, such as device isolation regions, gate contacts, and the like. The transistors 1040 are not limited to the type and configuration depicted in FIG. 10 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

Returning to FIG. 10, a transistor 1040 may include a gate 1022 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1040 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1040 along the source-channel-drain direction, the gate electrode may consist of a U-shaped structure that includes a bottom portion substantially parallel to the surface of the die substrate 1002 and two sidewall portions that are substantially perpendicular to the top surface of the die substrate 1002. In other embodiments, at least one of the metal layers that form the gate electrode may simply be a planar layer that is substantially parallel to the top surface of the die substrate 1002 and does not include sidewall portions substantially perpendicular to the top surface of the die substrate 1002. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1020 may be formed within the die substrate 1002 adjacent to the gate 1022 of individual transistors 1040. The S/D regions 1020 may be formed using an implantation/diffusion process or an etching/deposition process, for example. In the former process, dopants such as boron, aluminum, antimony, phosphorous, or arsenic may be ion-implanted into the die substrate 1002 to form the S/D regions 1020. An annealing process that activates the dopants and causes them to diffuse farther into the die substrate 1002 may follow the ion-implantation process. In the latter process, the die substrate 1002 may first be etched to form recesses at the locations of the S/D regions 1020. An epitaxial deposition process may then be carried out to fill the recesses with material that is used to fabricate the S/D regions 1020. In some implementations, the S/D regions 1020 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1020 may be formed using one or more alternate semiconductor materials such as germanium or a group III-V material or alloy. In further embodiments, one or more layers of metal and/or metal alloys may be used to form the S/D regions 1020.

Electrical signals, such as power and/or input/output (I/O) signals, may be routed to and/or from the devices (e.g., transistors 1040) of the device layer 1004 through one or more interconnect layers disposed on the device layer 1004 (illustrated in FIG. 10 as interconnect layers 1006-1010). For example, electrically conductive features of the device layer 1004 (e.g., the gate 1022 and the S/D contacts 1024) may be electrically coupled with the interconnect structures 1028 of the interconnect layers 1006-1010. The one or more interconnect layers 1006-1010 may form a metallization stack (also referred to as an "ILD stack") 1019 of the integrated circuit device 1000.

The interconnect structures 1028 may be arranged within the interconnect layers 1006-1010 to route electrical signals according to a wide variety of designs; in particular, the arrangement is not limited to the particular configuration of interconnect structures 1028 depicted in FIG. 10. Although a particular number of interconnect layers 1006-1010 is depicted in FIG. 10, embodiments of the present disclosure include integrated circuit devices having more or fewer interconnect layers than depicted.

In some embodiments, the interconnect structures 1028 may include lines 1028*a* and/or vias 1028*b* filled with an electrically conductive material such as a metal. The lines 1028*a* may be arranged to route electrical signals in a direction of a plane that is substantially parallel with a surface of the die substrate 1002 upon which the device layer 1004 is formed. For example, the lines 1028*a* may route electrical signals in a direction in and out of the page and/or in a direction across the page from the perspective of FIG. 10. The vias 1028*b* may be arranged to route electrical signals in a direction of a plane that is substantially perpendicular to the surface of the die substrate 1002 upon which the device layer 1004 is formed. In some embodiments, the vias 1028*b* may electrically couple lines 1028*a* of different interconnect layers 1006-1010 together.

The interconnect layers 1006-1010 may include a dielectric material 1026 disposed between the interconnect structures 1028, as shown in FIG. 10. In some embodiments, dielectric material 1026 disposed between the interconnect structures 1028 in different ones of the interconnect layers 1006-1010 may have different compositions; in other embodiments, the composition of the dielectric material 1026 between different interconnect layers 1006-1010 may be the same. The device layer 1004 may include a dielectric material 1026 disposed between the transistors 1040 and a bottom layer of the metallization stack as well. The dielectric material 1026 included in the device layer 1004 may have a different composition than the dielectric material 1026 included in the interconnect layers 1006-1010; in other embodiments, the composition of the dielectric material 1026 in the device layer 1004 may be the same as a dielectric material 1026 included in any one of the interconnect layers 1006-1010.

A first interconnect layer 1006 (referred to as Metal 1 or "M1") may be formed directly on the device layer 1004. In some embodiments, the first interconnect layer 1006 may include lines 1028*a* and/or vias 1028*b*, as shown. The lines 1028*a* of the first interconnect layer 1006 may be coupled with contacts (e.g., the S/D contacts 1024) of the device layer 1004. The vias 1028*b* of the first interconnect layer 1006 may be coupled with the lines 1028*a* of a second interconnect layer 1008.

The second interconnect layer 1008 (referred to as Metal 2 or "M2") may be formed directly on the first interconnect layer 1006. In some embodiments, the second interconnect layer 1008 may include via 1028*b* to couple the lines 1028 of the second interconnect layer 1008 with the lines 1028*a* of a third interconnect layer 1010. Although the lines 1028*a* and the vias 1028*b* are structurally delineated with a line within individual interconnect layers for the sake of clarity, the lines 1028*a* and the vias 1028*b* may be structurally and/or materially contiguous (e.g., simultaneously filled during a dual-damascene process) in some embodiments.

The third interconnect layer 1010 (referred to as Metal 3 or "M3") (and additional interconnect layers, as desired) may be formed in succession on the second interconnect layer 1008 according to similar techniques and configurations described in connection with the second interconnect layer 1008 or the first interconnect layer 1006. In some embodiments, the interconnect layers that are "higher up" in the metallization stack 1019 in the integrated circuit device 1000 (i.e., farther away from the device layer 1004) may be thicker that the interconnect layers that are lower in the metallization stack 1019, with lines 1028*a* and vias 1028*b* in the higher interconnect layers being thicker than those in the lower interconnect layers.

The integrated circuit device 1000 may include a solder resist material 1034 (e.g., polyimide or similar material) and one or more conductive contacts 1036 formed on the interconnect layers 1006-1010. In FIG. 10, the conductive contacts 1036 are illustrated as taking the form of bond pads. The conductive contacts 1036 may be electrically coupled with the interconnect structures 1028 and configured to route the electrical signals of the transistor(s) 1040 to external devices. For example, solder bonds may be formed on the one or more conductive contacts 1036 to mechanically and/or electrically couple an integrated circuit die including the integrated circuit device 1000 with another component (e.g., a printed circuit board). The integrated circuit device 1000 may include additional or alternate structures to route the electrical signals from the interconnect layers 1006-1010; for example, the conductive contacts 1036 may include other analogous features (e.g., posts) that route the electrical signals to external components. The conductive contacts 1036 may serve as any of the conductive contacts described throughout this disclosure.

In some embodiments in which the integrated circuit device 1000 is a double-sided die, the integrated circuit device 1000 may include another metallization stack (not shown) on the opposite side of the device layer(s) 1004. This metallization stack may include multiple interconnect layers as discussed above with reference to the interconnect layers 1006-1010, to provide conductive pathways (e.g., including conductive lines and vias) between the device layer(s) 1004 and additional conductive contacts (not shown) on the opposite side of the integrated circuit device 1000 from the conductive contacts 1036. These additional conductive contacts may serve as any of the conductive contacts described throughout this disclosure.

In other embodiments in which the integrated circuit device 1000 is a double-sided die, the integrated circuit device 1000 may include one or more through silicon vias (TSVs) through the die substrate 1002; these TSVs may make contact with the device layer(s) 1004, and may provide conductive pathways between the device layer(s) 1004 and additional conductive contacts (not shown) on the opposite side of the integrated circuit device 1000 from the conductive contacts 1036. These additional conductive contacts may serve as any of the conductive contacts described throughout this disclosure. In some embodiments, TSVs extending through the substrate can be used for routing power and ground signals from conductive contacts on the opposite side of the integrated circuit device 1000 from the conductive contacts 1036 to the transistors 1040 and any other components integrated into the die 1000, and the metallization stack 1019 can be used to route I/O signals from the conductive contacts 1036 to transistors 1040 and any other components integrated into the die 1000.

Multiple integrated circuit devices 1000 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 11:
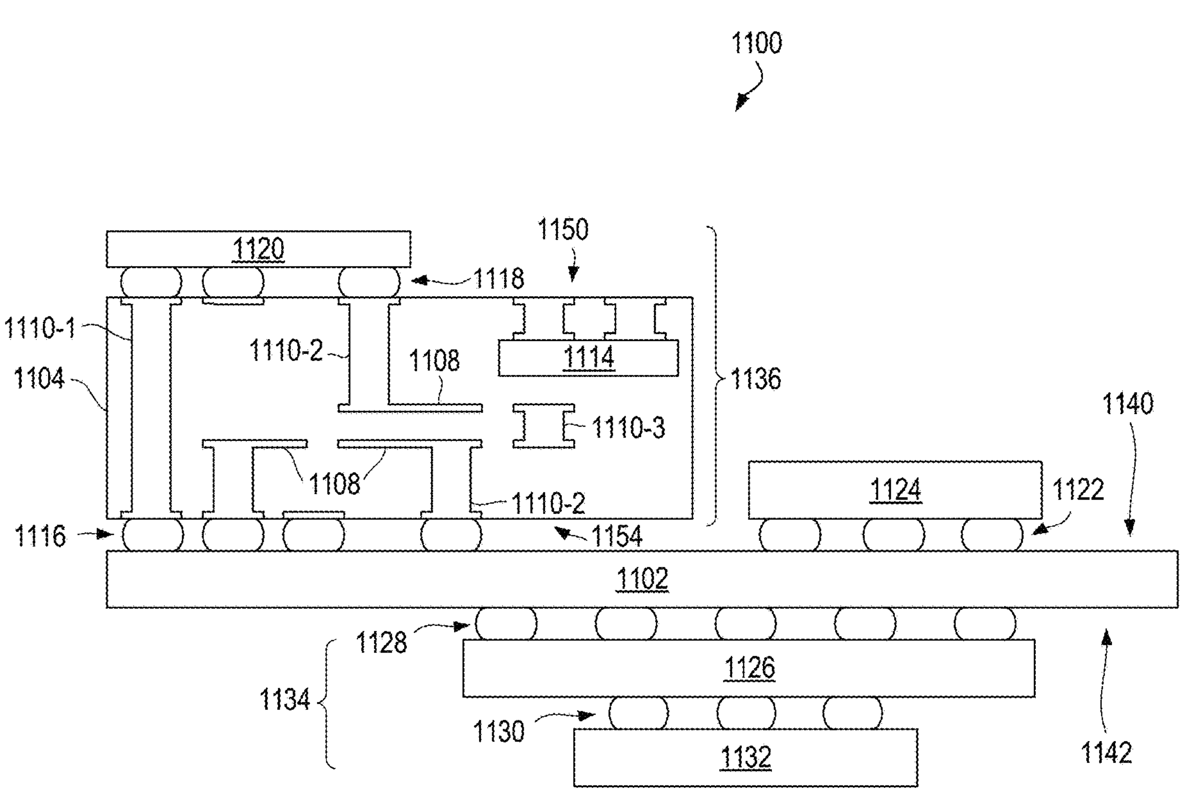
FIG. 11 is a cross-sectional side view of an integrated circuit device assembly that may include a microelectronic assembly, in accordance with any of the embodiments disclosed herein.

FIG. 11 is a cross-sectional side view of an integrated circuit device assembly 1100 that may include any of the embodiments disclosed herein (e.g., optical package 100, optical connectors 100, 200, 300, 400, 500, 600, 700). In some embodiments, the integrated circuit device assembly 1100 may be a microelectronic assembly. The integrated circuit device assembly 1100 includes a number of components disposed on a circuit board 1102 (which may be a motherboard, system board, mainboard, etc.). The integrated circuit device assembly 1100 includes components disposed on a first face 1140 of the circuit board 1102 and an opposing second face 1142 of the circuit board 1102; generally, components may be disposed on one or both faces 1140 and 1142. Any of the integrated circuit components discussed below with reference to the integrated circuit device assembly 1100 may take the form of any suitable ones of the embodiments of the microelectronic assemblies disclosed herein.

In some embodiments, the circuit board 1102 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1102. In other embodiments, the circuit board 1102 may be a non-PCB substrate. The integrated circuit device assembly 1100 illustrated in FIG. 11 includes a package-on-interposer structure 1136 coupled to the first face 1140 of the circuit board 1102 by coupling components 1116. The coupling components 1116 may electrically and mechanically couple the package-on-interposer structure 1136 to the circuit board 1102, and may include solder balls (as shown in FIG. 11), pins (e.g., as part of a pin grid array (PGA), contacts (e.g., as part of a land grid array (LGA)), male and female portions of a socket, an adhesive, an underfill material, and/or any other suitable electrical and/or mechanical coupling structure. The coupling components 1116 may serve as the coupling components illustrated or described for any of the substrate assembly or substrate assembly components described herein, as appropriate.

The package-on-interposer structure 1136 may include an integrated circuit component 1120 coupled to an interposer 1104 by coupling components 1118. The coupling components 1118 may take any suitable form for the application, such as the forms discussed above with reference to the coupling components 1116. Although a single integrated circuit component 1120 is shown in FIG. 11, multiple integrated circuit components may be coupled to the interposer 1104; indeed, additional interposers may be coupled to the interposer 1104. The interposer 1104 may provide an intervening substrate used to bridge the circuit board 1102 and the integrated circuit component 1120.

The integrated circuit component 1120 may be a packaged or unpacked integrated circuit product that includes one or more integrated circuit dies (e.g., the die 902 of FIG. 9, the integrated circuit device 1000 of FIG. 10) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1120, a single monolithic integrated circuit die comprises solder bumps attached to contacts on the die. The solder bumps allow the die to be directly attached to the interposer 1104. The integrated circuit component 1120 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1120 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1120 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1120 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as “chiplets”. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1104 may spread connections to a wider pitch or reroute a connection to a different connection. For example, the interposer 1104 may couple the integrated circuit component 1120 to a set of ball grid array (BGA) conductive contacts of the coupling components 1116 for coupling to the circuit board 1102. In the embodiment illustrated in FIG. 11, the integrated circuit component 1120 and the circuit board 1102 are attached to opposing sides of the interposer 1104; in other embodiments, the integrated circuit component 1120 and the circuit board 1102 may be attached to a same side of the interposer 1104. In some embodiments, three or more components may be interconnected by way of the interposer 1104.

In some embodiments, the interposer 1104 may be formed as a PCB, including multiple metal layers separated from one another by layers of dielectric material and interconnected by electrically conductive vias. In some embodiments, the interposer 1104 may be formed of an epoxy resin, a fiberglass-reinforced epoxy resin, an epoxy resin with inorganic fillers, a ceramic material, or a polymer material such as polyimide. In some embodiments, the interposer 1104 may be formed of alternate rigid or flexible materials that may include the same materials described above for use in a semiconductor substrate, such as silicon, germanium, and other group III-V and group IV materials. The interposer 1104 may include metal interconnects 1108 and vias 1110, including but not limited to through hole vias 1110-1 (that extend from a first face 1150 of the interposer 1104 to a second face 1154 of the interposer 1104), blind vias 1110-2 (that extend from the first or second faces 1150 or 1154 of the interposer 1104 to an internal metal layer), and buried vias 1110-3 (that connect internal metal layers).

In some embodiments, the interposer 1104 can comprise a silicon interposer. Through silicon vias (TSV) extending through the silicon interposer can connect connections on a first face of a silicon interposer to an opposing second face of the silicon interposer. In some embodiments, an interposer 1104 comprising a silicon interposer can further comprise one or more routing layers to route connections on a first face of the interposer 1104 to an opposing second face of the interposer 1104.

The interposer 1104 may further include embedded devices 1114, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1104. The package-on-interposer structure 1136 may take the form of any of the package-on-interposer structures known in the art. In embodiments where the interposer is a non-printed circuit board The integrated circuit device assembly 1100 may include an integrated circuit component 1124 coupled to the first face 1140 of the circuit board 1102 by coupling components 1122. The coupling components 1122 may take the form of any of the embodiments discussed above with reference to the coupling components 1116, and the integrated circuit component 1124 may take the form of any of the embodiments discussed above with reference to the integrated circuit component 1120.

The integrated circuit device assembly 1100 illustrated in FIG. 11 includes a package-on-package structure 1134 coupled to the second face 1142 of the circuit board 1102 by coupling components 1128. The package-on-package structure 1134 may include an integrated circuit component 1126 and an integrated circuit component 1132 coupled together by coupling components 1130 such that the integrated circuit component 1126 is disposed between the circuit board 1102 and the integrated circuit component 1132. The coupling components 1128 and 1130 may take the form of any of the embodiments of the coupling components 1116 discussed above, and the integrated circuit components 1126 and 1132 may take the form of any of the embodiments of the integrated circuit component 1120 discussed above. The package-on-package structure 1134 may be configured in accordance with any of the package-on-package structures known in the art.

Figure 12:
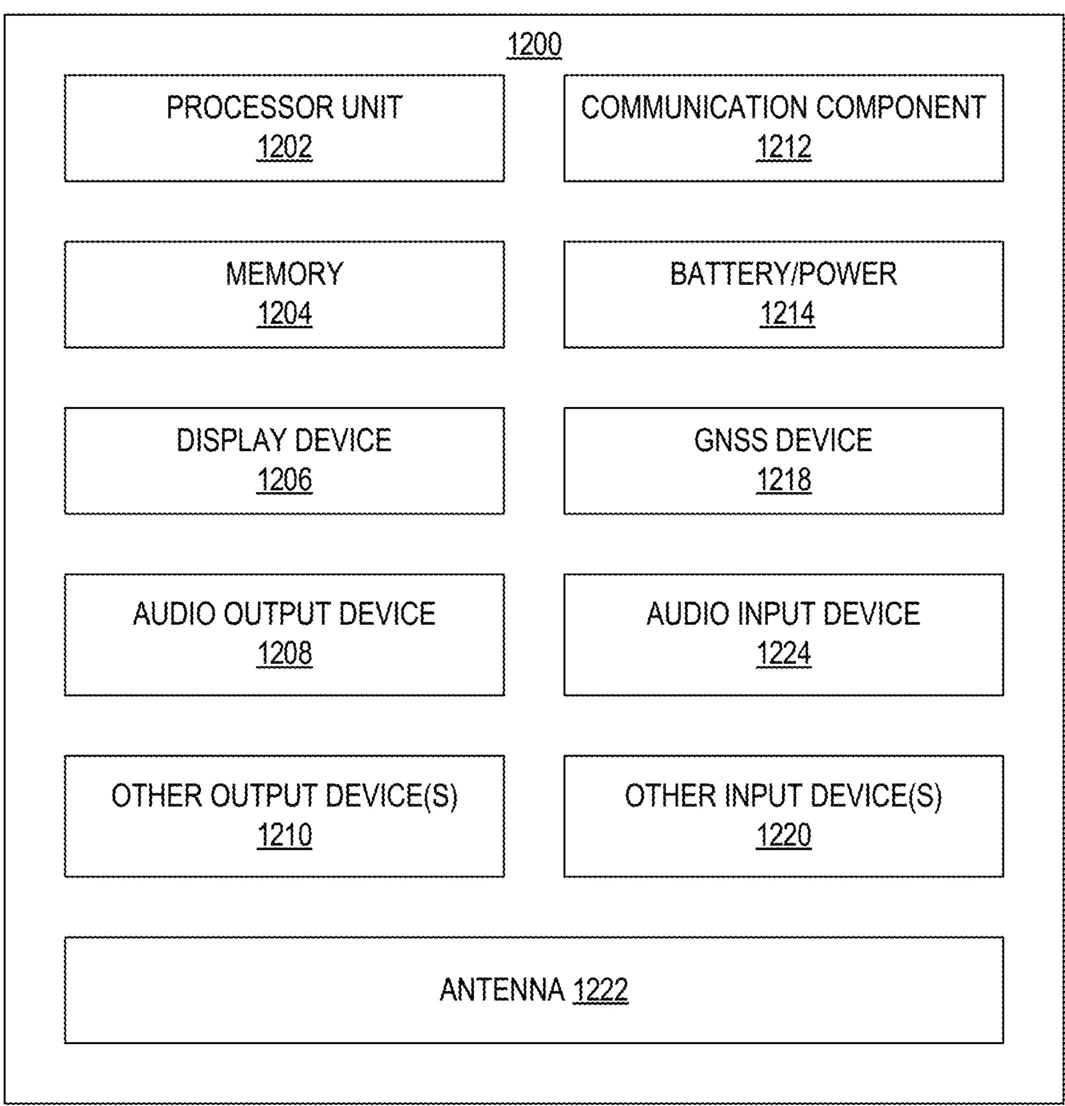
FIG. 12 is a block diagram of an example electronic device that may include a microelectronic assembly, in accordance with any of the embodiments disclosed herein.

FIG. 12 is a block diagram of an example electronic device 1200 that may include one or more of the embodiments disclosed herein. For example, any suitable ones of the components of the electronic device 1200 may include one or more of the optical packages 100, optical connectors 100, 200, 300, 400, 500, 600, 700, integrated circuit device assemblies 1100, integrated circuit components 1120, integrated circuit devices 1000, or integrated circuit dies 902 disclosed herein. In some embodiments, for example, the electronic device 1200 and/or its respective components (e.g., processor units 1202, input/output (I/O) devices 1210, 1220, communication components 1212, memory 1204) may include an integrated circuit package with an integrated circuit die packaged with photonics circuitry and/or optical connectors according to any of the embodiments described herein. A number of components are illustrated in FIG. 12 as included in the electronic device 1200, but any one or more of these components may be omitted or duplicated, as suitable for the application. In some embodiments, some or all of the components included in the electronic device 1200 may be attached to one or more motherboards mainboards, or system boards. In some embodiments, one or more of these components are fabricated onto a single system-on-a-chip (SoC) die.

Additionally, in various embodiments, the electronic device 1200 may not include one or more of the components illustrated in FIG. 12, but the electronic device 1200 may include interface circuitry for coupling to the one or more components. For example, the electronic device 1200 may not include a display device 1206, but may include display device interface circuitry (e.g., a connector and driver circuitry) to which a display device 1206 may be coupled. In another set of examples, the electronic device 1200 may not include an audio input device 1224 or an audio output device 1208, but may include audio input or output device interface circuitry (e.g., connectors and supporting circuitry) to which an audio input device 1224 or audio output device 1208 may be coupled.

The electronic device 1200 may include one or more processor units 1202 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1202 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electronic device 1200 may include a memory 1204, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1204 may include memory that is located on the same integrated circuit die as the processor unit 1202. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electronic device 1200 can comprise one or more processor units 1202 that are heterogeneous or asymmetric to another processor unit 1202 in the electronic device 1200. There can be a variety of differences between the processing units 1202 in a system in terms of a spectrum of metrics of merit including architectural, microarchitectural, thermal, power consumption characteristics, and the like. These differences can effectively manifest themselves as asymmetry and heterogeneity among the processor units 1202 in the electronic device 1200.

In some embodiments, the electronic device 1200 may include a communication component 1212 (e.g., one or more communication components). For example, the communication component 1212 can manage wireless communications for the transfer of data to and from the electronic device 1200. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1212 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1212 may operate in accordance with other wireless protocols in other embodiments. The electronic device 1200 may include an antenna 1222 to facilitate wireless communications and/or to receive other wireless communications (such as AM or FM radio transmissions).

In some embodiments, the communication component 1212 may manage wired communications, such as electrical, optical, or any other suitable communication protocols (e.g., IEEE 802.3 Ethernet standards). As noted above, the communication component 1212 may include multiple communication components. For instance, a first communication component 1212 may be dedicated to shorter-range wireless communications such as Wi-Fi or Bluetooth, and a second communication component 1212 may be dedicated to longer-range wireless communications such as global positioning system (GPS), EDGE, GPRS, CDMA, WiMAX, LTE, EV-DO, or others. In some embodiments, a first communication component 1212 may be dedicated to wireless communications, and a second communication component 1212 may be dedicated to wired communications.

The electronic device 1200 may include battery/power circuitry 1214. The battery/power circuitry 1214 may include one or more energy storage devices (e.g., batteries or capacitors) and/or circuitry for coupling components of the electronic device 1200 to an energy source separate from the electronic device 1200 (e.g., AC line power).

The electronic device 1200 may include a display device 1206 (or corresponding interface circuitry, as discussed above). The display device 1206 may include one or more embedded or wired or wirelessly connected external visual indicators, such as a heads-up display, a computer monitor, a projector, a touchscreen display, a liquid crystal display (LCD), a light-emitting diode display, or a flat panel display.

The electronic device 1200 may include an audio output device 1208 (or corresponding interface circuitry, as discussed above). The audio output device 1208 may include any embedded or wired or wirelessly connected external device that generates an audible indicator, such speakers, headsets, or earbuds.

The electronic device 1200 may include an audio input device 1224 (or corresponding interface circuitry, as discussed above). The audio input device 1224 may include any embedded or wired or wirelessly connected device that generates a signal representative of a sound, such as microphones, microphone arrays, or digital instruments (e.g., instruments having a musical instrument digital interface (MIDI) output). The electronic device 1200 may include a Global Navigation Satellite System (GNSS) device 1218 (or corresponding interface circuitry, as discussed above), such as a Global Positioning System (GPS) device. The GNSS device 1218 may be in communication with a satellite-based system and may determine a geolocation of the electronic device 1200 based on information received from one or more GNSS satellites, as known in the art.

The electronic device 1200 may include other output device(s) 1210 (or corresponding interface circuitry, as discussed above). Examples of the other output device(s) 1210 may include an audio codec, a video codec, a printer, a wired or wireless transmitter for providing information to other devices, or an additional storage device.

The electronic device 1200 may include other input device(s) 1220 (or corresponding interface circuitry, as discussed above). Examples of the other input device(s) 1220 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electronic device 1200 may have any desired form factor, such as a hand-held or mobile electronic device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electronic device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electronic device or an embedded computing system (e.g., computing systems that are part of a vehicle, smart home appliance, consumer electronics product or equipment, manufacturing equipment). In some embodiments, the electronic device 1200 may be any other electrical or electronic device that processes data. In some embodiments, the electronic device 1200 may comprise multiple discrete physical components. Given the range of devices that the electronic device 1200 can be manifested as in various embodiments, in some embodiments, the electronic device 1200 can be referred to as a computing device or a computing system.

Example Embodiments

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes an apparatus, comprising: an optical ferrule, wherein the optical ferrule includes: a plurality of holes to couple a fiber array to the optical ferrule; a mating protrusion, wherein the plurality of holes extend through the mating protrusion; and a first set of alignment features; and an optical receptacle, wherein the optical receptacle includes: a plurality of optical waveguides; a mating cavity to mate with the mating protrusion on the optical ferrule, wherein the plurality of optical waveguides extend to the mating cavity; and a second set of alignment features to mate with the first set of alignment features on the optical ferrule, wherein the plurality of optical waveguides on the optical receptacle align with the plurality of holes on the optical ferrule when the first and second sets of alignment features mate.

Example 2 includes the apparatus of Example 1, further comprising the fiber array, wherein the fiber array includes a plurality of optical fibers coupled to the plurality of holes in the optical ferrule.

Example 3 includes the apparatus of Example 2, wherein the optical ferrule is pluggable into the optical receptacle, wherein the plurality of optical fibers align with the plurality of optical waveguides when the optical ferrule is plugged into the optical receptacle.

Example 4 includes the apparatus of any of Examples 1-3, wherein: the first set of alignment features include a plurality of pins on the optical ferrule; and the second set of alignment features include: a plurality of pin holes in the optical receptacle, wherein the plurality of pins on the optical ferrule are to mate with the plurality of pin holes in the optical receptacle; or a plurality of grooves on the optical receptacle, wherein the plurality of pins on the optical ferrule are to mate with the plurality of grooves on the optical receptacle.

Example 5 includes the apparatus of any of Examples 1-3, wherein: the first set of alignment features include a plurality of sidewall grooves, wherein the plurality of sidewall grooves are in sidewalls of the mating protrusion; and the second set of alignment features include a plurality of sidewall protrusions, wherein the plurality of sidewall protrusions are on sidewalls of the mating cavity, and wherein the plurality of sidewall protrusions are to mate with the plurality of sidewall grooves.

Example 6 includes the apparatus of Example 5, wherein: the plurality of sidewall grooves have a V shape, a U shape, a semi-cylindrical shape, or a trapezoidal shape; and the plurality of sidewall protrusions have a semi-cylindrical shape or a trapezoidal shape.

Example 7 includes the apparatus of any of Examples 5-6, wherein: the first set of alignment features further include semi-cylindrical protrusions within the plurality of sidewall grooves; and the second set of alignment features further include chamfers on the plurality of sidewall protrusions.

Example 8 includes the apparatus of any of Examples 5-7, wherein the second set of alignment features further include semi-cylindrical protrusions on the plurality of sidewall protrusions.

Example 9 includes the apparatus of any of Examples 1-8, wherein: the first set of alignment features include: a first set of surface grooves on the optical ferrule; and a plurality of wires in the first set of surface grooves; and the second set of alignment features include a second set of surface grooves on the optical receptacle, wherein the plurality of wires are to mate with the second set of surface grooves to couple the optical ferrule to the optical receptacle.

Example 10 includes the apparatus of any of Examples 1-9, wherein: the first set of alignment features include a first set of chamfers on sidewalls of the mating protrusion; and the second set of alignment features include a second set of chamfers on sidewalls of the mating cavity.

Example 11 includes the apparatus of any of Examples 1-10, wherein: the optical ferrule is a glass ferrule; and the optical receptacle is a glass receptacle.

Example 12 includes an integrated circuit package, comprising: a package substrate; an integrated circuit die coupled to the package substrate; a photonic integrated circuit (PIC) to send or receive optical signals, wherein the PIC is coupled to the package substrate; and an optical interposer coupled to the PIC, wherein the optical interposer includes: a plurality of optical waveguides; a mating receptacle to mate with an optical ferrule, wherein the plurality of optical waveguides extend to the mating receptacle; and a set of alignment features to align the plurality of optical waveguides with a plurality of optical fibers in the optical ferrule.

Example 13 includes the integrated circuit package of Example 12, wherein: the set of alignment features is a first set of alignment features; and the integrated circuit package further comprises the optical ferrule, wherein the optical ferrule includes: a plurality of holes; a fiber array coupled to the plurality of holes, wherein the fiber array includes the plurality of optical fibers; a mating protrusion to mate with the mating receptacle on the optical interposer, wherein the plurality of holes extend through the mating protrusion; and a second set of alignment features to mate with the first set of alignment features on the optical interposer.

Example 14 includes the integrated circuit package of Example 13, wherein: the first set of alignment features include a plurality of pin holes or grooves in the optical interposer; and the second set of alignment features include a plurality of pins on the optical ferrule, wherein the plurality of pins on the optical ferrule are to mate with the plurality of pin holes or grooves in the optical interposer.

Example 15 includes the integrated circuit package of Example 13, wherein: the first set of alignment features include a plurality of sidewall protrusions, wherein the plurality of sidewall protrusions are on sidewalls of the mating receptacle; and the second set of alignment features include a plurality of sidewall grooves, wherein the plurality of sidewall grooves are in sidewalls of the mating protrusion, wherein the plurality of sidewall protrusions are to mate with the plurality of sidewall grooves.

Example 16 includes the integrated circuit package of Example 15, wherein: the plurality of sidewall protrusions have a semi-cylindrical shape or a trapezoidal shape; and the plurality of sidewall grooves have a V shape, a U shape, a semi-cylindrical shape, or a trapezoidal shape.

Example 17 includes the integrated circuit package of any of Examples 15-16, wherein: the first set of alignment features further include chamfers on the plurality of sidewall protrusions; and the second set of alignment features further include semi-cylindrical protrusions within the plurality of sidewall grooves.

Example 18 includes the integrated circuit package of any of Examples 13-17, wherein: the first set of alignment features include a first set of surface grooves on the optical interposer; and the second set of alignment features include: a second set of surface grooves on the optical ferrule; and a plurality of wires in the second set of surface grooves, wherein the plurality of wires are to mate with the first set of surface grooves to couple the optical ferrule to the optical interposer.

Example 19 includes the integrated circuit package of any of Examples 13-18, wherein: the first set of alignment features include a first set of chamfers on sidewalls of the mating receptacle; and the second set of alignment features include a second set of chamfers on sidewalls of the mating protrusion.

Example 20 includes the integrated circuit package of any of Examples 12-19, wherein the integrated circuit die includes a microcontroller, a microprocessor, a central processing unit, a graphics processing unit, a vision processing unit, a tensor processing unit, an application-specific integrated circuit, a field-programmable gate array, an input/output device, a switch, a network interface controller, a memory device, or a persistent storage device.

Example 21 includes an electronic device, comprising: a printed circuit board; and an integrated circuit package coupled to the printed circuit board, wherein the integrated circuit package includes: a package substrate; an integrated circuit die coupled to the package substrate; a photonic integrated circuit (PIC) to send or receive optical signals, wherein the PIC is coupled to the package substrate; an optical interposer coupled to the PIC, wherein the optical interposer includes: a plurality of optical waveguides; a mating receptacle, wherein the plurality of optical waveguides extend to the mating receptacle; and a first set of alignment features; and an optical ferrule, wherein the optical ferrule includes: a plurality of holes; a fiber array coupled to the plurality of holes, wherein the fiber array includes a plurality of optical fibers; a mating protrusion to mate with the mating receptacle on the optical interposer, wherein the plurality of holes extend through the mating protrusion; and a second set of alignment features to mate with the first set of alignment features on the optical interposer, wherein the plurality of optical waveguides on the optical interposer align with the plurality of optical fibers in the optical ferrule when the first and second sets of alignment features mate.

Example 22 includes the electronic device of Example 21, wherein the integrated circuit die includes a processing device, a memory device, a storage device, or a communication device.

Example 23 includes the electronic device of any of Examples 21-22, wherein the electronic device is a mobile device, a wearable device, a computer, a server, a video playback device, a video game console, a display device, a camera, or an appliance.

Example 24 includes a method of optical packaging, comprising: attaching a photonic integrated circuit (PIC) to a package substrate; attaching an optical interposer to the PIC, wherein the optical interposer includes: a plurality of optical waveguides; a mating receptacle to mate with an optical ferrule, wherein the plurality of optical waveguides extend to the mating receptacle; and a set of alignment features to align the plurality of optical waveguides with a plurality of optical fibers in the optical ferrule; attaching an electronic integrated circuit (EIC) to the package substrate; and attaching an integrated circuit die to the package substrate.

Example 25 includes the method of Example 24, wherein: the set of alignment features is a first set of alignment features; and the method further comprises plugging the optical ferrule into the optical interposer, wherein the optical ferrule includes: a plurality of holes; a fiber array coupled to the plurality of holes, wherein the fiber array includes the plurality of optical fibers; a mating protrusion to mate with the mating receptacle on the optical interposer, wherein the plurality of holes extend through the mating protrusion; and a second set of alignment features to mate with the first set of alignment features on the optical interposer.

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. Further, it should be understood that the various embodiments shown in the figures are illustrative representations and are not necessarily drawn to scale.

Moreover, the illustrations and/or descriptions of various embodiments may be simplified or approximated for ease of understanding, and as a result, they may not necessarily reflect the level of precision nor variation that may be present in actual embodiments. For example, while some figures generally indicate straight lines, right angles, and smooth surfaces, actual implementations of the disclosed embodiments may have less than perfect straight lines and right angles, and some features may have surface topography or otherwise be non-smooth, given real-world limitations of fabrication processes. Similarly, illustrations and/or descriptions of how components are arranged may be simplified or approximated for ease of understanding and may vary by some margin of error in actual embodiments (e.g., due to fabrication processes, etc.).

Unless otherwise specified, the use of the ordinal adjectives "first," "second," and "third," etc., to describe a common object, merely indicate that different instances of like objects to which are being referred and are not intended to imply that the objects so described must be in a given sequence, either temporally, spatially, in ranking or in any other manner.

The terms "substantially," "close," "approximately," "near," and "about," generally refer to being within +/−10% of a target value (unless otherwise specified). Similarly, terms describing spatial relationships, such as "perpendicular," "orthogonal," or "coplanar," may refer to being substantially within the described spatial relationships (e.g., within +/−10 degrees of orthogonality).

Certain terminology may also be used in the foregoing description for the purpose of reference only, and thus are not intended to be limiting. For example, terms such as "upper," "lower," "above," "below," "bottom," and "top" refer to directions in the drawings to which reference is made. Terms such as "front," "back," "rear," and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The terms "over", "between", "adjacent", "to", and "on" as used herein may refer to a relative position of one layer or component with respect to other layers or components. For example, one layer "over" or "on" another layer, "adjacent" to another layer, or bonded "to" another layer may be directly in contact with the other layer or may have one or more intervening layers. One layer "between" layers may be directly in contact with the layers or may have one or more intervening layers.

The meaning of "a," "an," and "the" include plural references. The meaning of "in" includes "in" and "on."

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional", "profile" and "plan" correspond to orthogonal planes within a cartesian coordinate system. Thus, cross-sectional and profile views are taken in the x-z plane, and plan views are taken in the x-y plane. Typically, profile views in the x-z plane are cross-sectional views. Where appropriate, drawings are labeled with axes to indicate the orientation of the figure.

The term "package" generally refers to a self-contained carrier of one or more dice, where the dice are attached to the package substrate, and may be encapsulated for protection, with integrated or wire-bonded interconnects between the dice and leads, pins or bumps located on the external portions of the package substrate. The package may contain a single die, or multiple dice, providing a specific function. The package is usually mounted on a printed circuit board for interconnection with other packaged integrated circuits and discrete components, forming a larger circuit.

The term "cored" generally refers to a substrate of an integrated circuit package built upon a board, card or wafer comprising a non-flexible stiff material. Typically, a small printed circuit board is used as a core, upon which integrated circuit device and discrete passive components may be soldered. Typically, the core has vias extending from one side to the other, allowing circuitry on one side of the core to be coupled directly to circuitry on the opposite side of the core. The core may also serve as a platform for building up layers of conductors and dielectric materials.

The term "coreless" generally refers to a substrate of an integrated circuit package having no core. The lack of a core allows for higher-density package architectures, as the through-vias have relatively large dimensions and pitch compared to high-density interconnects.

The term "land side", if used herein, generally refers to the side of the substrate of the integrated circuit package closest to the plane of attachment to a printed circuit board, motherboard, or other package. This is in contrast to the term "die side", which is the side of the substrate of the integrated circuit package to which the die or dice are attached.

The term "dielectric" generally refers to any number of non-electrically conductive materials that make up the structure of a package substrate. For purposes of this disclosure, dielectric material may be incorporated into an integrated circuit package as layers of laminate film or as a resin molded over integrated circuit dice mounted on the substrate.

The term "metallization" generally refers to metal layers formed over and through the dielectric material of the package substrate. The metal layers are generally patterned to form metal structures such as traces and bond pads. The metallization of a package substrate may be confined to a single layer or in multiple layers separated by layers of dielectric.

The term "bond pad" generally refers to metallization structures that terminate integrated traces and vias in integrated circuit packages and dies. The term "solder pad" may be occasionally substituted for "bond pad" and carries the same meaning.

The term "solder bump" generally refers to a solder layer formed on a bond pad. The solder layer typically has a round shape, hence the term "solder bump".

The term "substrate" generally refers to a planar platform comprising dielectric and/or metallization structures. The substrate may mechanically support and electrically couple one or more IC dies on a single platform, with encapsulation of the one or more IC dies by a moldable dielectric material. The substrate generally comprises solder bumps as bonding interconnects on both sides. One side of the substrate, generally referred to as the "die side", may comprise solder bumps for chip or die bonding. The opposite side of the substrate, generally referred to as the "land side", may comprise solder bumps for bonding the package to a printed circuit board.

The term "assembly" generally refers to a grouping of parts into a single functional unit. The parts may be separate and are mechanically assembled into a functional unit, where the parts may be removable. In another instance, the parts may be permanently bonded together. In some instances, the parts are integrated together.

The terms "coupled" or "connected" means a direct or indirect connection, such as a direct electrical, mechanical, magnetic or fluidic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal.

The invention claimed is:

1. An apparatus, comprising:

an optical ferrule, wherein the optical ferrule includes:
- a plurality of holes to couple a fiber array to the optical ferrule;
- a mating protrusion, wherein the plurality of holes extend through the mating protrusion; and
- a first set of alignment features; and an optical receptacle, wherein the optical receptacle includes:
- a plurality of optical waveguides;
- a mating cavity to mate with the mating protrusion on the optical ferrule, wherein the plurality of optical waveguides extend to the mating cavity; and a second set of alignment features to mate with the first set of alignment features on the optical ferrule, wherein the plurality of optical waveguides on the optical receptacle align with the plurality of holes on the optical ferrule when the first and second sets of alignment features mate.

2. The apparatus of claim 1, further comprising the fiber array, wherein the fiber array includes a plurality of optical fibers coupled to the plurality of holes in the optical ferrule.

3. The apparatus of claim 2, wherein the optical ferrule is pluggable into the optical receptacle, wherein the plurality of optical fibers align with the plurality of optical waveguides when the optical ferrule is plugged into the optical receptacle.

4. The apparatus of claim 1, wherein:

the first set of alignment features include a plurality of pins on the optical ferrule; and the second set of alignment features include:

a plurality of pin holes in the optical receptacle, wherein the plurality of pins on the optical ferrule are to mate with the plurality of pin holes in the optical receptacle; or a plurality of grooves on the optical receptacle, wherein the plurality of pins on the optical ferrule are to mate with the plurality of grooves on the optical receptacle.

5. The apparatus of claim 1, wherein:

the first set of alignment features include a plurality of sidewall grooves, wherein the plurality of sidewall grooves are in sidewalls of the mating protrusion; and the second set of alignment features include a plurality of sidewall protrusions, wherein the plurality of sidewall protrusions are on sidewalls of the mating cavity, and wherein the plurality of sidewall protrusions are to mate with the plurality of sidewall grooves.

6. The apparatus of claim 5, wherein:

the plurality of sidewall grooves have a V shape, a U shape, a semi-cylindrical shape, or a trapezoidal shape; and the plurality of sidewall protrusions have a semi-cylindrical shape or a trapezoidal shape.

7. The apparatus of claim 6, wherein:

the first set of alignment features further include semi-cylindrical protrusions within the plurality of sidewall grooves; and the second set of alignment features further include chamfers on the plurality of sidewall protrusions.

8. The apparatus of claim 6, wherein the second set of alignment features further include semi-cylindrical protrusions on the plurality of sidewall protrusions.

9. The apparatus of claim 1, wherein:

the first set of alignment features include:

a first set of surface grooves on the optical ferrule; and a plurality of wires in the first set of surface grooves; and the second set of alignment features include a second set of surface grooves on the optical receptacle, wherein the plurality of wires are to mate with the second set of surface grooves to couple the optical ferrule to the optical receptacle.

10. The apparatus of claim 1, wherein:

the first set of alignment features include a first set of chamfers on sidewalls of the mating protrusion; and the second set of alignment features include a second set of chamfers on sidewalls of the mating cavity.

11. The apparatus of claim 1, wherein:

the optical ferrule is a glass ferrule; and the optical receptacle is a glass receptacle.

12. An optical assembly, comprising:

a first optical connector, wherein the first optical connector comprises:

an optical ferrule, wherein the optical ferrule comprises a mating protrusion and a first set of alignment features on opposing sidewalls of the mating protrusion; and a plurality of optical fibers coupled to the optical ferrule; and a second optical connector, wherein the second optical connector comprises:

a plurality of optical waveguides;

a mating cavity to mate with the mating protrusion; and a second set of alignment features on opposing sidewalls of the mating cavity, wherein the second set of alignment features are to mate with the first set of alignment features;

wherein the optical fibers and the optical waveguides are aligned when the first and second optical connectors are mated.

13. The optical assembly of claim 12, wherein the first optical connector is pluggable into the second optical connector, wherein the optical fibers are aligned with the optical waveguides when the first optical connector is plugged into the second optical connector.

14. The optical assembly of claim 12, wherein:

the first set of alignment features include a plurality of sidewall grooves on the opposing sidewalls of the mating protrusion; and the second set of alignment features include a plurality of sidewall protrusions on the opposing sidewalls of the mating cavity, wherein the sidewall protrusions are to mate with the sidewall grooves.

15. The optical assembly of claim 14, wherein:

the sidewall grooves have a V shape, a U shape, a semi-cylindrical shape, or a trapezoidal shape; and the sidewall protrusions have a semi-cylindrical shape or a trapezoidal shape.

16. The optical assembly of claim 15, wherein:

the first set of alignment features further include semi-cylindrical protrusions within the sidewall grooves; and the second set of alignment features further include chamfers on the sidewall protrusions.

17. The optical assembly of claim 15, wherein the second set of alignment features further include semi-cylindrical protrusions on the sidewall protrusions.

18. The optical assembly of claim 12, wherein:

the first set of alignment features include a first set of chamfers on the opposing sidewalls of the mating protrusion; and the second set of alignment features include a second set of chamfers on the opposing sidewalls of the mating cavity.

19. The optical assembly of claim 12, further comprising a photonic integrated circuit (PIC), wherein the first optical connector is optically coupled to the PIC.

* * * * *